United States Patent

Santoh et al.

[11] Patent Number: 5,190,849
[45] Date of Patent: Mar. 2, 1993

[54] OPTICAL RECORDING MEDIUM CONTAINING CARBOXYLIC ACID-BASE METALLIC COMPLEX AND SQUARYLIUM-BASE OR CROCONIUM-BASE DYE

[75] Inventors: Tsuyoshi Santoh, Yokohama; Chieko Mihara, Kawasaki; Hiroyuki Sugata, Yamato, all of Japan

[73] Assignee: Canon Kabushiki Kaisha, Tokyo, Japan

[21] Appl. No.: 596,034

[22] Filed: Oct. 11, 1990

[30] Foreign Application Priority Data

Oct. 12, 1989 [JP] Japan .................. 1-266966

[51] Int. Cl.$^5$ .............................. G11B 7/24
[52] U.S. Cl. ................... 430/495; 430/270; 430/945; 346/135.1
[58] Field of Search ............... 430/495, 270, 332, 337, 430/338, 341, 945; 346/135.1

[56] References Cited

U.S. PATENT DOCUMENTS

| | | | |
|---|---|---|---|
| 4,502,066 | 2/1985 | Satake et al. | 346/209 |
| 4,548,886 | 10/1985 | Katagiri et al. | 430/70 |
| 4,602,264 | 7/1986 | Shioi et al. | 346/205 |
| 4,614,705 | 9/1986 | Umehara | 430/286 |
| 4,626,496 | 12/1986 | Sato | 430/270 |
| 4,782,006 | 11/1988 | Nishimura et al. | 430/292 |
| 4,871,601 | 10/1989 | Miura et al. | 428/64 |
| 4,921,780 | 5/1990 | Oguchi et al. | 430/495 |
| 4,965,178 | 10/1990 | Santoh et al. | 430/495 |

FOREIGN PATENT DOCUMENTS 165181 7/1988 Japan .

*Primary Examiner*—Charles L. Bowers, Jr.
*Assistant Examiner*—John A. McPherson
*Attorney, Agent, or Firm*—Fitzpatrick, Cella, Harper & Scinto

[57] ABSTRACT

An optical recording medium contains at least one squarylium- or croconium-base dye of formulae [I] or [II], and a carboxylic acid-base metallic complex:

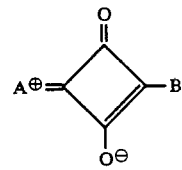

[I]

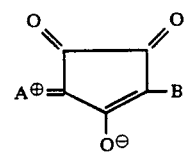

[II]

where A$\oplus$ is a cationic bivalent organic residue and B is a monovalent organic residue. The optical recording medium has an absorption band for light in the long wavelength region and is superior in stability against heat and light.

8 Claims, 2 Drawing Sheets

OPTICAL RECORDING MEDIUM CONTAINING CARBOXYLIC ACID-BASE METALLIC COMPLEX AND SQUARYLIUM-BASE OR CROCONIUM-BASE DYE

BACKGROUND OF THE INVENTION

1. Field of the Invention

This invention relates to an optical recording medium suitable for writing and reproduction of information with a laser beam, in particular, one emitted from a semiconductor laser. More particularly, this invention relates to an optical recording medium which has improved properties under harsh environmental conditions and can be used in optical discs, optical cards and the like.

2. Description of Prior Art

Generally speaking, an optical recording medium such as an optical disc or optical card can record information at high density by forming optically detectable small pits of, for example, about 1 μm on a thin recording layer having spiral, circular, or straight line grooves provided on a substrate. When a converged laser beam is scanned along the grooves on the surface of the recording layer, the recording layer absorbs the laser energy at the spots irradiated to form optically detectable pits, whereby information is written.

For example, according to a heat mode recording tenchnique, the recording layer absorbs heat energy to form small concave pits by evaporation or melting at the sites that have absorbed the heat energy. According to an other heat mode recording technique, pits having optically detectable density difference are formed at the sites that have absorbed laser energy.

The information recorded in the optical recording medium is detected by scanning a laser beam along the grooves and reading the optical differences between the portions where the pits are formed and the portions where no pit is formed.

For instance, a laser is irradiated to scan the surface of the recording layer along the grooves and the laser energy reflected is monitored with a photodetector. When the pit portions are irradiated, the output of the photodetector is low; when the pit-free portions are irradiated, the laser is reflected sufficiently, thereby increasing the output of the photodetector.

For the above optical recording medium for use as an optical disc and optical card, so far there have been proposed a metallic thin film such as an aluminum evaporated film, and a thin film mainly consisted of an inorganic material such as bismuth, tellurium oxide or a chalcogenide-base amorphous glass. These thin films are generally sensitive to light rays of wavelength ranging from 350 to 800 nm and have a high reflectance for laser beams, and hence exhibit lower efficiency of laser energy utilization and poor sensitivity characteriatics.

In recent years, there have been developed semiconductor laser devices of small size and low cost. Further, laser emitted from these devices can be directly modulated. However, most of these lasers have a wavelength of at least 750 nm. Accordingly, in order to carry out recording and/or reproduction with such a long wavelength semiconductor laser, the recording layer should have an absorption band in a long wavelength region, generally 750–850 nm.

For those reasons, there has recently been researched an organic thin film which can develop optical changes in physical properties with light energy at relatively long wavelengths (e.g., greater than 780 nm). This type of organic film is effective in that pits can be formed on the film by a semiconductor laser having an oscillation wave-length of around 780 nm or 830 nm. Examples of such organic films are those containing squarylium or croconium-base dyes disclosed in U.S. Pat. No. 4,548,886.

In general, however, those organic compounds which have an absorption band in the longer wave-length side are unstable against heat and light.

More specifically, since optical recording media are not always handled in offices full-equipped with air conditioning systems, care should be taken in harsh conditions such as storage in transporting warehouses and the rising temperatures in a drive unit. A medium superior in stability at high temperatures is therefore desired. When the optical recording medium is used as an optical card, it is difficult to make the card into a hollow structure (i.e., air sandwiched structure) from considerations of thickness and strength. The optical card is, therefore, necessarily made into a laminated structure by bonding a pair of opposite substrates directly to a recording layer using an adhesive. For the adhesive used, a hotmelt adhesive is effective because it is superior in operability without degrading the writing sensitivity of the information on the recording layer. However, the hotmelt adhesive is exposed to a high temperature of about 100° C., though for a short period of time when the substrates are bonded to the recording layer. Therefore, there is a need for a recording layer that is more resistant against heat.

Further, optical cards are personally carried and handled in most cases, and highly liable to be treated in a rough manner. There is, therefore, also a need for an optical card having excellent stability under harsh environmental conditions besides heat-resistance.

In addition, the type of optical recording medium that uses an organic compound mentioned above to form the recording layer accompanies the problem that, over aging, the organic compound tends to deteriorate upon repeated irradiation of regenerating (reproduction) light or natural light. There is, therefore, a need for an optical recording medium also having excellent stability against light.

SUMMARY OF THE INVENTION

An object of the present invention is to provide an optical recording medium which has an absorption band for light rays in the longer wavelength side and is stabler even under environmental conditions of high temperature and high humidity.

Another object of the present invention is to provide an optical recording medium which has excellent stability against light such as regenerating or natural light.

As a result of conducting various and intensive studies on the above objects, the inventors have made the present invention upon finding that a carboxylic acid-base metallic complex is very effective as a stabilizer for preventing squarylium- or croconium-base dyes of ampholyte ion type from deteriorating under heat and light.

More specifically, the optical recording medium of the present invention contains at least one squarylium- or croconium-base dyes of formulae [I] or [II], and a carboxylic acid-base metallic complex:

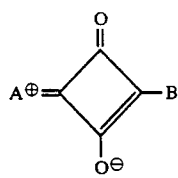

[I]

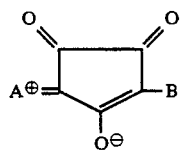

[II]

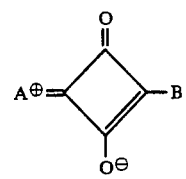

[I]

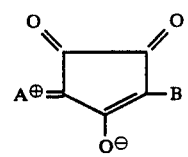

[II]

Where $A^\oplus$ is a cationic bivalent organic residue and B is a monovalent organic residue.

Thus, in accordance with the present invention, it is believed that because the optical recording medium contains both the dye compound of ampholyte ion type and the carboxylic acid-base metallic complex having an intermolecular amphoteric pair ion effect, the carboxylic acid-base metallic complex as an intermolecular or intramolecular amphoteric ion species is coordinated in the dye compound to form a complex for stabilizing the dye itself against light, thereby making it possible to provide an optical recording medium which has excellent stability against light and other harsh environmental conditions.

The applicants previously filed Japanese Patent Laid-Open No. 63-165181 (1988) disclosing an optical recording medium which contains a squarylium- or croconium-base dye and a metallic chelate compound in a recording layer and which is improved in heat resistance. Also, U.S. Pat. No. 4,626,496 discloses an optical recording medium which contains a polymethyne-base dye and a metallic chelate compound in a recording layer.

However, none of the foregoing describes or refers to an optical recording medium which contains a squarylium- or croconium-base dye of ampholyte ion type and a carboxylic acid-base metallic complex in a recording layer, as well as the resultant improvement in resistance against heat and light.

DESCRIPTION OF THE PREFERRED EMBODIMENTS

Figure 1:
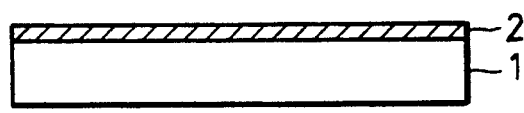
FIGS. 1, 2, 3, 4, 5 and 6 are sectional views showing different embodiments of an optical recording medium of the present invention.

Hereinafter, the present invention will be described in detail.

An optical recording medium of the present invention contains a squarylium-base and/or croconium-base dye of ampholyte ion type and a carboxylic acid-base metallic complex in a recording layer which is subjected to a thermal action upon absorbing electromagnetic radiation and, thereby, is susceptible to changes such as deformation or discoloration on account of the thermal action.

In the present invention, the squarylium-base dye and the croconium-base dye include those dyes which are represented by the following general formulae [I] and [II], respectively:

where $A^\oplus$ is a cationic bivalent organic residue and B is a monovalent organic residue. Although the cationic bivalent organic residue $A^\oplus$ can be selected from various kinds of groups, those bivalent organic residues which are represented by the following general formulae [III]-[VI] have absorbency for light rays in the long wavelength side and are, therefore, particularly preferable:

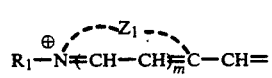

[III]

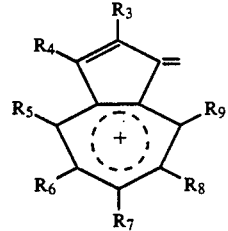

[IV]

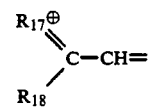

[V]

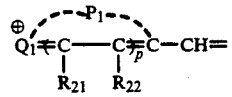

[VI]

Although the monovalent organic residue B can be selected from various kinds of groups, those monovalent organic residues represented by the following general formulae [VII]-[X] are particularly preferable:

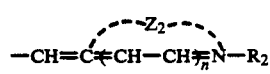

[VII]

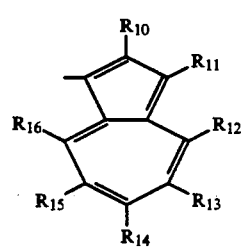

[VIII]

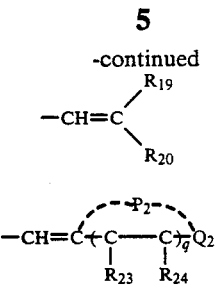

In the above general formulae [III]–[X], $R_1$ and $R_2$ each is a hydrogen atom, a substituted or unsubstituted alkyl group, a substituted or unsubstituted alkenyl group, a cyclic alkyl group, an allyl group, a substituted or unsubstituted aralkyl group, or a substituted or unsubstituted aryl group. More particularly, $R_1$ and $R_2$ are independently a hydrogen atom; an alkyl group such as a methyl, ethyl, n-propyl, iso-propyl, n-butyl, sec-butyl, t-butyl, n-amyl, iso-butyl, a t-amyl, n-hexyl, n-octyl, or t-octyl group; a substituted alkyl group such as a 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)-carbamylmethyl, a 3-(acetylsulfamyl)-propyl, or 4-(acetylsulfamyl)-butyl group; a cyclic alkyl group such as a cyclohexyl group; an alkenyl group such as an allyl group ($CH_2=CH-CH_2-$), or other normal chain or branched alkenyl group such as a pentenyl, hexenyl, heptenyl, octenyl, pentadienyl or hexadienyl group; an aralkyl group such as a benzyl, phenethyl, α-naphthylmethyl, or β-naphthylmethyl group; a substituted aralkyl group such as a carboxybenzyl, sulfobenzyl, or hydroxybenzyl group; an aryl group such as a phenyl group; or a substituted aryl group such as a carboxyphenyl, sulfophenyl, or hydroxyphenyl group.

$Z_1$ and $Z_2$ each is an atomic group necessary to complete a substituted or unsubstituted heterocyclic ring. More particularly, $Z_1$ and $Z_2$ are independently an atomic group necessary to complete a substituted or unsubstituted complex ring, and examples include a thiazole series nucleus such as thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole; a benzothiazole series nucleus such as benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-dioxymethylenebenzothiazole, 5-hydroxybenzothiazole, 6-hydroxybenzothiazole, or 4,5,6,7-tetrahydrobenzothiazole; a naphthothiazole series nucleus such as naphtho[2,1-d]thiazole, naphtho[1,2-d]thiazole, 5-methoxynaphtho[1,2-d]thiazole, 5-ethoxynaphtho[1,2-d]thiazole, 8-methoxynaphtho[2,1-d]thiazole, or 7-methoxynaphtho[2,1-d]thiazole; thionaphthene[7,6-d]thiazole series nucleus such as 7-methoxythionaphthene[7,6-d]thiazole; an oxazole series nucleus such as 4-methyloxazole, 5-methyloxazole, 4-phenyloxazole, 4,5-diphenyloxazole, 4-ethyloxazole, 4,5-dimethyloxazole, or 5-phenyloxazole; a benzooxazole series nucleus such as benzooxazole, 5-chlorobenzooxazole, 5-methylbenzooxazole, 5-phenylbenzooxazole, 6-methylbenzooxazole, 5,6-dimethylbenzooxazole, 5-methoxybenzooxazole, 6-methoxybenzooxazole, 5-hydroxybenzooxazole, or 6-hydroxybenzooxazole; a naphthooxazole series nucleus such as naptho[2,1-d]oxazole or naphtho[1,2-d]oxazole; a selenazole series nucleus such as 4-methylselenazole or 4-phenylselenazole; a benzoselenazole series nucleus such as benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-dioxymethylenebenzoselenazole, 5-hydroxybenzoselenazole, or 4,5,6,7-tetrahydrobenzoselenazole; a naphthoselenazole series nucleus such as naphtho[2,1-d]selenazole or naphtho[1,2-d]selenazole; a thiazoline series nucleus such as thiazoline, 4-methylthiazoline, 4-hydroxymethyl-4-methylthiazoline, or 4,4-bis-hydroxymethylthiazoline; an oxazoline series nucleus such as oxazoline; a selenazoline such as selenazoline; a 2-quinoline series nucleus such as quinoline, 6-methylquinoline, 6-chloroquinoline, 6-methoxyquinoline, 6-ethoxyquinoline, or 6-hydroxyquinoline; a 4-quinoline series nucleus such as quinoline, 6-methoxyquinoline, 7-methylquinoline, or 8-methylquinoline; a 1-isoquinoline series nucleus such as isoquinoline or 3,4-dihydroisoquinoline; a 3-isoquinoline series nucleus such as isoquinoline; a 3,3-dialkylindolenine series nucleus such as 3,3-dimethylindolenine, 3,3-dimethyl-5-chloroindolenine, 3,3,5-trimethylindolenine, or 3,3,7-trimethylindolenine; a pyridine series nucleus such as pyridine or 5-methyl pyridine; a benzoimidazole series nucleus such as 1-ethyl-5,6-dichlorobenzoimidazole, 1-hydroxyethyl-5,5-dichlorobenzoimidazole, 1-ethyl-5-dichlorobenzoimidazole, 1-ethyl-5-dichlorobenzoimidazole, 1-ethyl-5,6-dibromobenzoimidazole, 1-ethyl-5-phenylbenzo imidazole, 1-ethyl-5-fluorobenzoimidazole, 1-ethyl-5-cyanobenzoimidazole, 1-(β-acetoxyethyl)-5-cyanobenzoimidazole, 1-ethyl-5-chloro-6-cyanobenzoimidazole, 1-ethyl-5-fluoro-6-cyanobenzoimidazole, 1-ethyl-5-acetylbenzoimidazole, 1-ethyl-5-carboxy-benzoimidazole, 1-ethyl-5-ethoxycarbonylbenzoimidazole, 1-ethyl-5-sulfamylbenzoimidazole, 1-ethyl-5-N-ethylsulfamylbenzoimidazole, 1-ethyl-5,6-difluorobenzoimidazole, 1-ethyl-5,6-dicyanobenzoimidazole, 1-ethyl-5-ethylsulfonylbenzoimidazole, 1-ethyl-5-methylsulfonylbenzoimidazole, 1-ethyl-5-trifluoromethylbenzoimidazole, 1-ethyl-5-trifluoromethylsulfonyl-benzoimidazole, or 1-ethyl-5-trifluoromethylsulfinyl-benzoimidazole.

Then, m and n each is an integer of 0 or 1.

$R_3$–$R_{16}$ each is a hydrogen atom, a halogen atom or a monovalent organic residue, and at least one of the combinations ($R_3$ and $R_4$), ($R_4$ and $R_5$), ($R_5$ and $R_6$), ($R_6$ and $R_7$), ($R_7$ and $R_8$), ($R_8$ and $R_9$), ($R_{10}$ and $R_{11}$), ($R_{11}$ and $R_{12}$), ($R_{12}$ and $R_{13}$), ($R_{13}$ and $R_{14}$), ($R_{14}$ and $R_{15}$), and ($R_{15}$ and $R_{16}$) may or may not form a substituted or unsubstituted condensed ring. Examples of the condensed ring include a substituted or unsubstituted aromatic ring such as a benzene, naphthalene, chlorobenzene, bromobenzene, methylbenzene, ethylbenzene, methoxybenzene, or ethoxybenzene ring; a heterocyclic ring such as a furan, benzofuran, pyrrole, thiophene, pyridine, quinoline, or thiazole ring; or an aliphatic ring such as a dimethylene, trimethylene, or tetramethylene ring. More particcularly, $R_3$–$R_{16}$ are independently a hydrogen atom, a halogen atom or a monovalent organic residue.

The monovalent organic residue can be selected from various kinds of groups. Examples include an alkyl group such as a methyl, ethyl, n-propyl, isopropyl, n-butyl, t-butyl, n-amyl, n-hexyl, n-octyl, 2-ethylhexyl, or t-octyl group; an alkoxy group such as a methoxy, ethoxy, propoxy, or butoxy group; a substituted or unsubstituted aryl group such as a phenyl, tolyl, xylyl, ethylphenyl, methoxyphenyl, ethoxyphenyl, chlorophenyl, nitrophenyl, dimethylaminophenyl, α-naphthyl, or β-naphthyl group; a substituted or unsubstituted heterocyclic ring such as a pyridyl, quinolyl, carbazolyl, furyl, thienyl, or pyrazoryl group; a substituted or unsubstituted aralkyl group such as a benzyl, 2-phenylethyl, 2-phenyl-1-methylethyl, bromobenzyl, 2-bromophenylethyl, methylbenzyl, methoxybenzyl, or nitribenzyl group; an acyl group such as an acetyl, propionyl, butyryl, valeryl, benzoyl, tolyoyl, naphthoyl, phthaloyl, or furoyl group; a substituted or unsubstituted styryl group such as a styryl, dimethylaminostyryl, diethylaminostyryl, dipropylaminostyryl, methoxystyryl, ethoxystyryl, or methylstyryl group; a nitro group, a hydroxy group, a mercapto group, a thioether group, a carboxyl group, carboxylic ester, carboxylic amide, or a cyano group; or a substituted or unsubstituted arylazo group such as a phenylazo, α-naphthylazo, β-naphthylazo, dimethylaminophenylazo, chlorophenylazo, nitrophenylazo, methoxyphenylazo, or tolylazo group.

$R_{17}$–$R_{20}$ each is a hydrogen atom, a substituted or unsubstituted alkyl group, a substituted or unsubstituted aryl group, a substituted or unsubstituted styryl group, or a substituted or unsubstituted heterocylic group. More particularly, $R_{17}$–$R_{20}$ are independently a hydrogen atom; an alkyl group such as a methyl, ethyl, n-propyl, iso-propyl, n-butyl, sec-butyl, iso-butyl, t-butyl, n-amyl, t-amyl, n-hexyl, n-octyl, or t-octyl group; other alkyl group, for example, a substituted alkyl group such as a 2-hydroxyethyl, 3-hydroxypropyl, 4-hydroxybutyl, 2-acetoxyethyl, a carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)-carbamylmethyl, 3-(acetylsulfamyl)-propyl, or 4-(acetylsulfamyl)-butyl group; a cyclic alkyl group such as a cyclohexyl group; an alkenyl group such as an allyl group ($CH_2$=CH—$CH_2$—), or other normal chain or branched alkenyl group such as a pentenyl, hexenyl, heptenyl, octenyl, pentadienyl or hexadienyl group; an aralkyl group such as a benzyl, phenethyl, α-naphthyl-methyl, or β-naphthylmethyl group; a substituted aralkyl group such as a carboxybenzyl, sulfobenzyl, or hydroxybenzyl group. $R_{17}$ and $R_{18}$ further each is a substituted or unsubstituted aryl group such as a phenyl, naphthyl, tolyl, xylyl, methoxyphenyl, dimethoxyphenyl, trimethoxyphenyl, ethoxyphenyl, dimethylaminophenyl, diethylaminophenyl, dipropylaminophenyl, dibenzylamino- phenyl, or diphenylaminophenyl group; a substituted or unsubstituted heterocyclic group such as a pyridyl, quinolyl, lepidyl, methylpyridyl, furyl, thienyl, indolyl, pyrrole, carbazolyl, or N-ethylcarbazolyl group; a substituted or unsubstituted styryl group such as a styryl, methoxystyryl, dimethoxystyryl, trimethoxystyryl, ethoxy-styryl, dimethylaminostyryl, diethylaminostyryl, dipropylaminostyryl, dibenzylaminostyryl, diphenylaminostyryl, 2,2-diphenylvinyl, 2-phenyl-2-methylvinyl, 2-(dimethylaminophenyl)-2-phenylvinyl, 2-(diehylaminophenyl)-2-phenylvinyl, 2-(dibenzylaminophenyl)-2-phenylvinyl, 2,2-di(diehylaminophenyl)vinyl, a 2,2-di(methoxy-phenyl)vinyl, 2,2-(ethoxyphenyl)vinyl, 2-(dimehylaminophenyl)-2-methylvinyl, or 2-(diehyl- aminophenyl)-2-ethylvinyl group.

$Q_1$ and $Q_2$ each is a sulphur, oxygen or selenium atom. $P_1$ and $P_2$ each is any hydrocarbon group, substituted or unsubstituted, necessary to complete a pyrane, thiopyrane, selenapyrane, benzopyrane, benzothiopyrane, benzoselenapyrane, naphthopyrane, naphthothiopyrane, or naphthoselenapyrane ring.

The aforesaid ring formed by the hydrocarbon group may be substituted by any of the following groups: examples include an alkyl group such as a methyl, ethyl, n-propyl, isopropyl, n-butyl, t-butyl, n-acyl, t-acyl, n-hexyl, n-octyl, or 2-ethylhexyl group; an alkoxy group such as a methoxy, ethoxy, propoxy, or butoxy group; a substituted or unsubstituted aryl group such as a phenyl, tolyl, xylyl, biphenyl, ethylphenyl, methoxyphenyl, ethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, or dibenzylaminophenyl group; a styryl group, or 4-phenyl-1,3-butadienyl or a substitution product thereof such as a styryl, 4-phenyl-1,3-butadienyl, methoxystyryl, dimethoxystyryl, ethoxystyryl, diethoxystyryl, dimethylaminostyryl, 4-(p-dimethylaminophenyl)1,3-butadienyl, or 4-(p-diethylaminophenyl)1,3-butadienyl group; or a heterocyclic group such as a 3-carbazolyl, 9-methyl-3-carbazolyl, 9-ethyl-3-carbazolyl, or 9-carbazolyl group.

$R_{21}$–$R_{24}$ each is a hydrogen atom, a substituted or unsubstituted alkyl group, a substituted or unsubstituted alkoxy group, a substituted or unsubstituted aryl group, a substituted or unsubstituted styryl group or 4-phenyl-1,3-butadienyl group, or a substituted or unsubstituted heterocylic group. More particularly, $R_{21}$–$R_{24}$ are independently a hydrogen atom; an alkyl group, particularly one having 1 to 15 carbon atoms, such as a methyl, ethyl, propyl, isopropyl, butyl, t-butyl, amyl, isoamyl, hexyl, octyl, nonyl, or dodecyl group; an alkoxy group such as a methoxy, ethoxy, propoxy, butoxy, amyloxy, hexoxy or octoxy group; an aryl group such as phenyl, α-naphthyl, or β-naphthyl group; a substituted aryl group such as a tolyl, xylyl, biphenyl, ethylphenyl, methoxyphenyl, ethoxyphenyl, amyloxyphenyl, dimethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, or dibenzylaminophenyl group; a styryl group or 4-phenyl-1,3-butadienyl group such as styryl or 4-phenyl-1,3-butadienyl; a substituted styryl group or 4-phenyl-1,3-butadienyl group such as a methoxystyryl, dimethoxy-styryl, ethoxystyryl, diethoxystyryl, dimethylaminostyryl, diethylaminostyryl, 4-(p-dimethylaminophenyl)1,3-butadienyl, or 4-(p-diethyl-aminophenyl)1,3-butadienyl group; or a substituted or unsubstituted heterocyclic group such as 3-carbazolyl, 9-methyl-3-carbazolyl, 9-ethyl-3-carbazolyl, or 9-carbazolyl group.

$R_{21}$–$R_{24}$ may link to form a benzene ring.

Then, p and q is an integer of 0 or 1.

Practical examples of the squarylium- and croconium-base dyes used in the present invention are enumerated below, but the present invention is not limited to the following examples.

EXAMPLES OF THE GENERAL FORMULA (I)

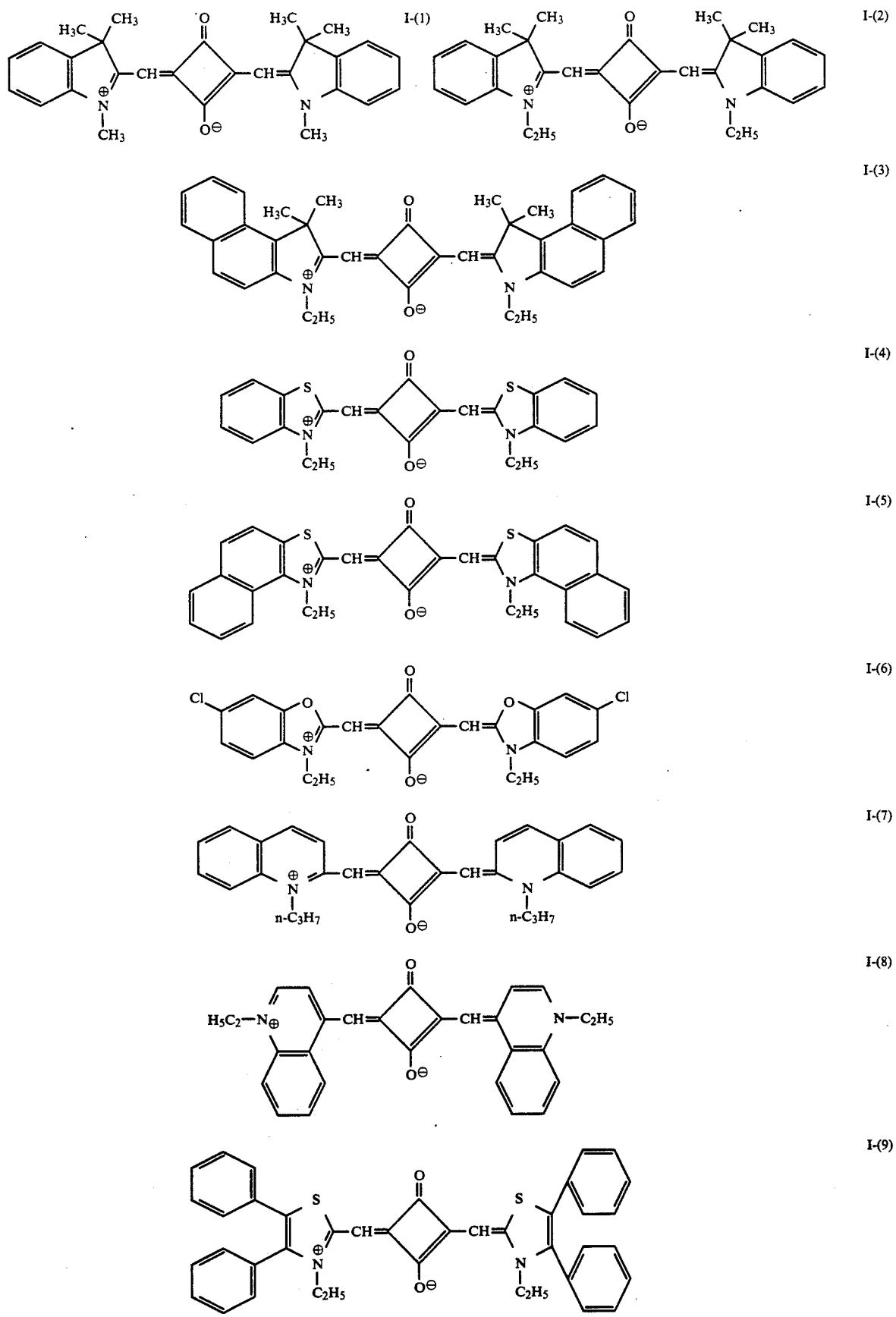

-continued
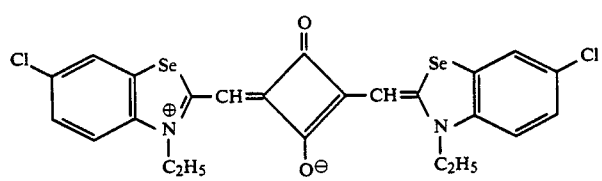
I-(10)
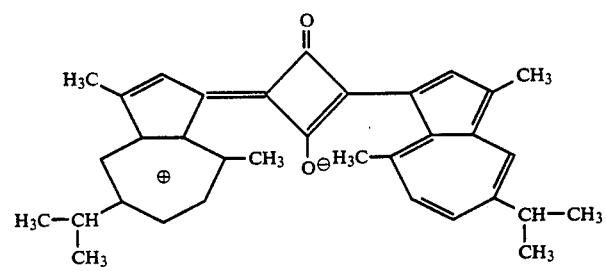
I-(11)
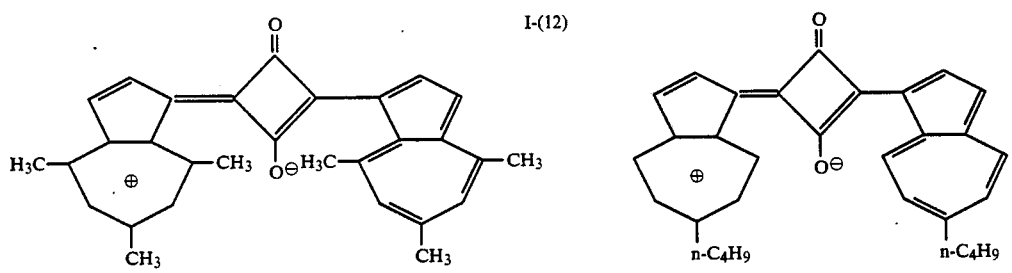
I-(12)       I-(13)
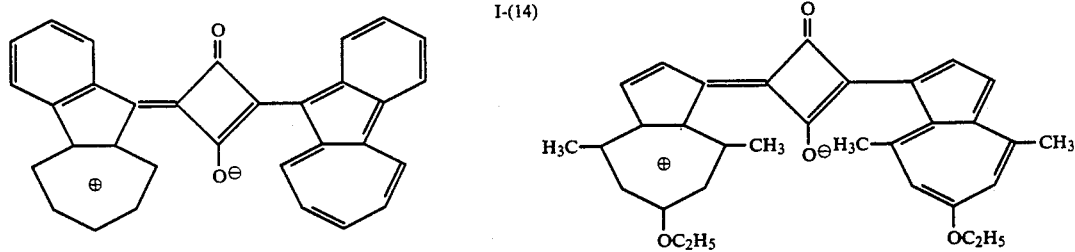
I-(14)       I-(15)
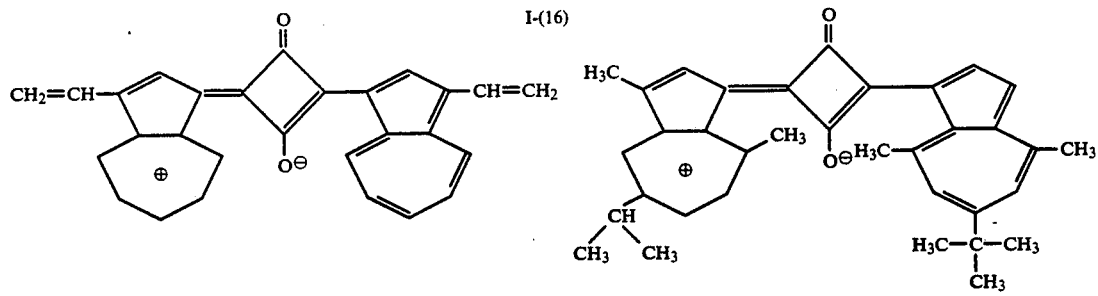
I-(16)       I-(17)
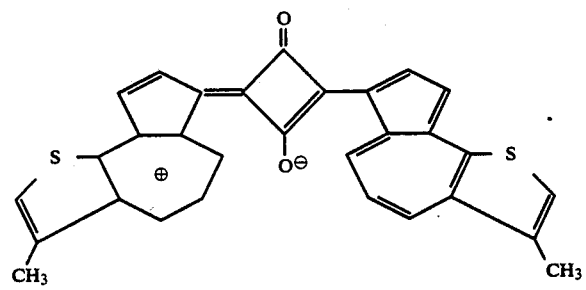
I-(18)

I-(19)
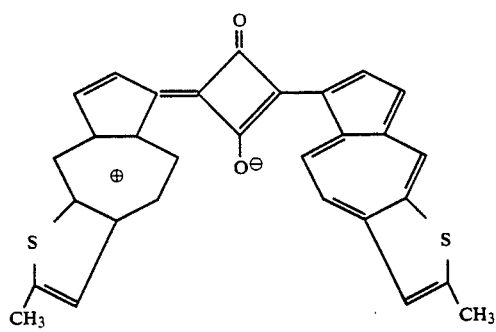
I-(20)
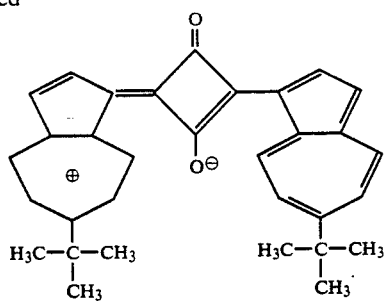
I-(21)
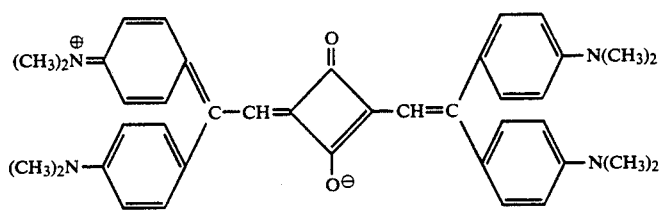
I-(22)
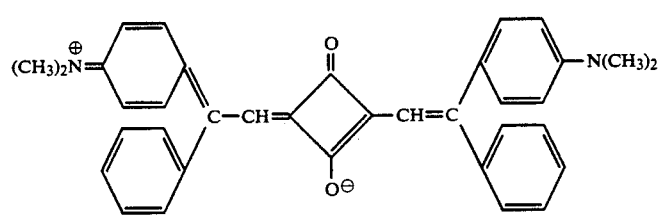
I-(23)
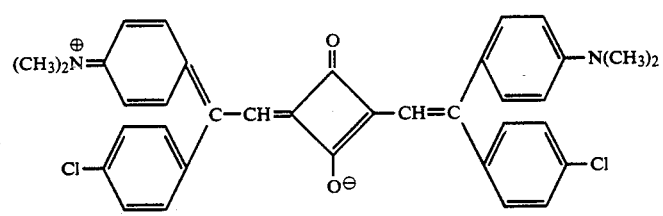
I-(24)
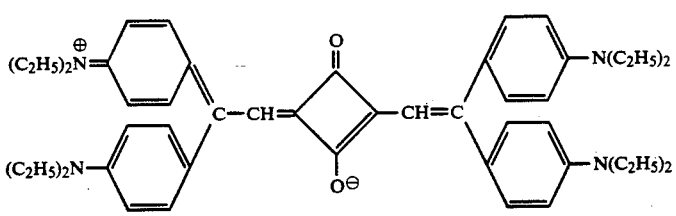
I-(25)
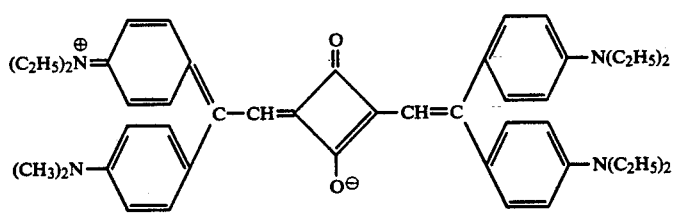
I-(26)
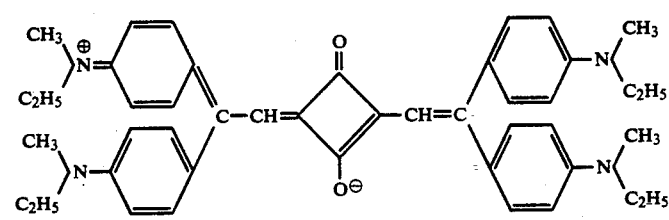

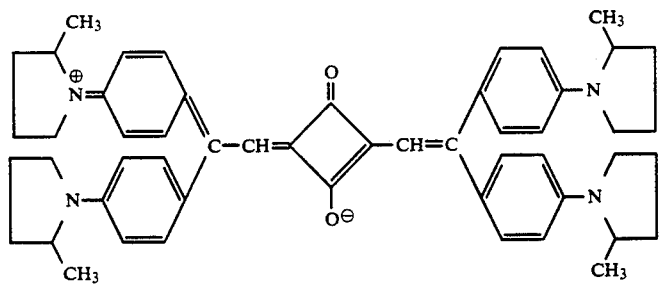
I-(27)
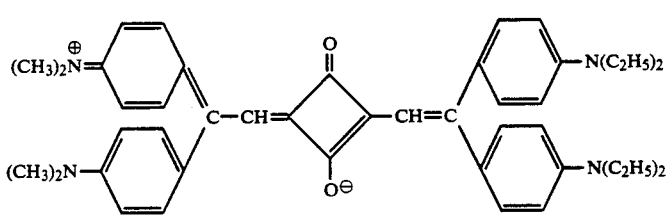
I-(28)
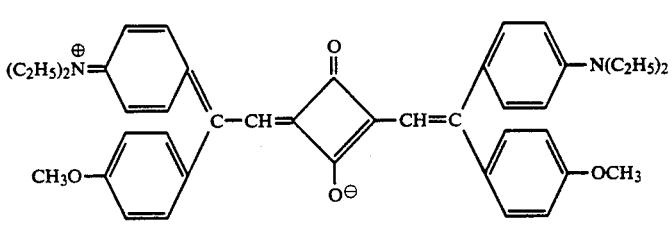
I-(29)
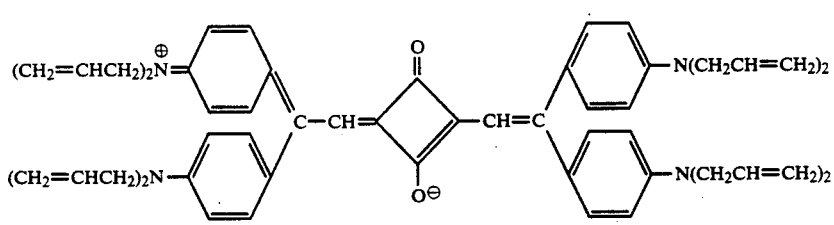
I-(30)
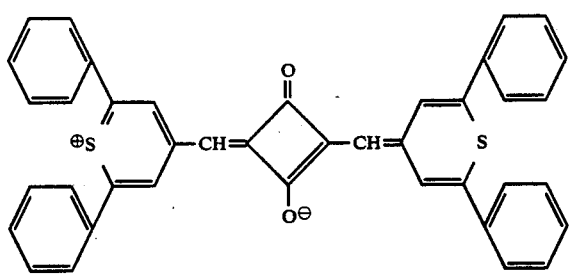
I-(31)
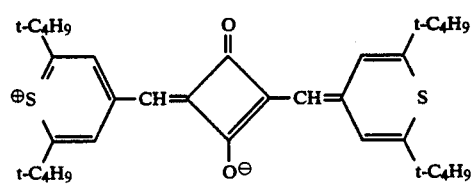
I-(32)

-continued
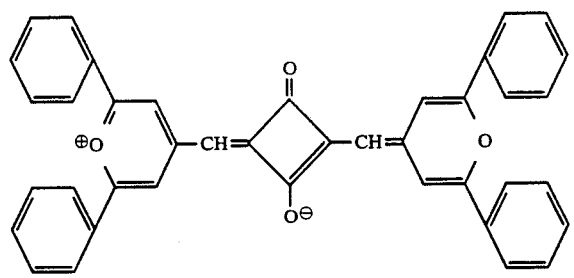
I-(33)
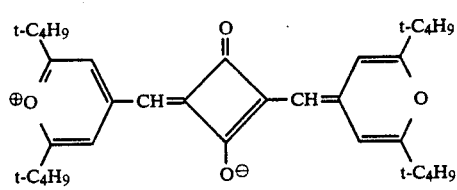
I-(34)
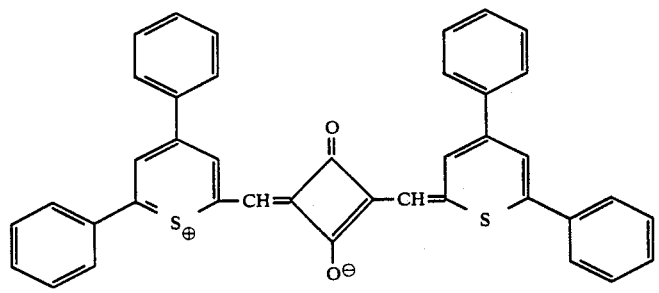
I-(35)
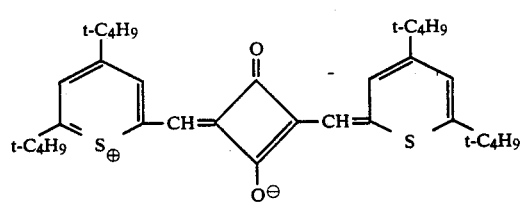
I-(36)
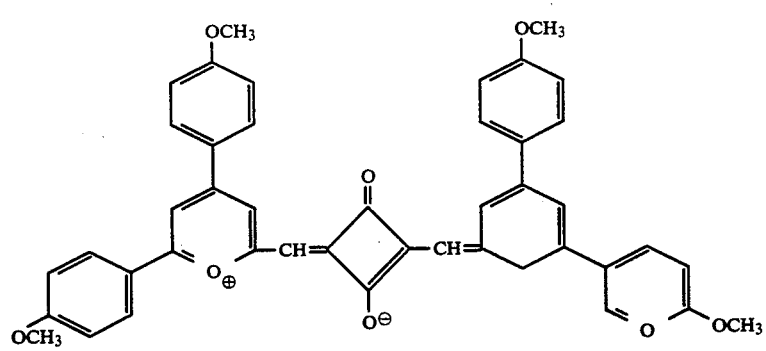
I-(37)
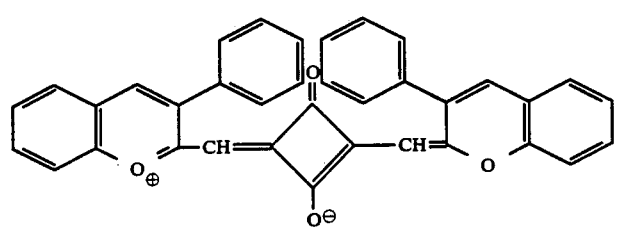
I-(38)

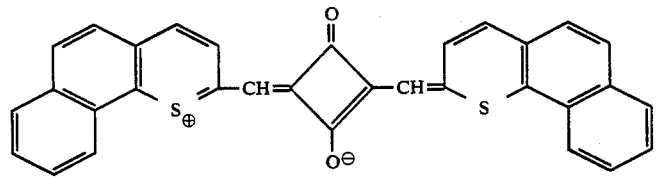
I-(39)
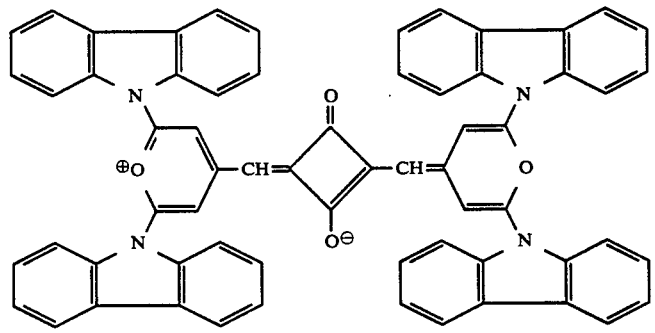
I-(40)
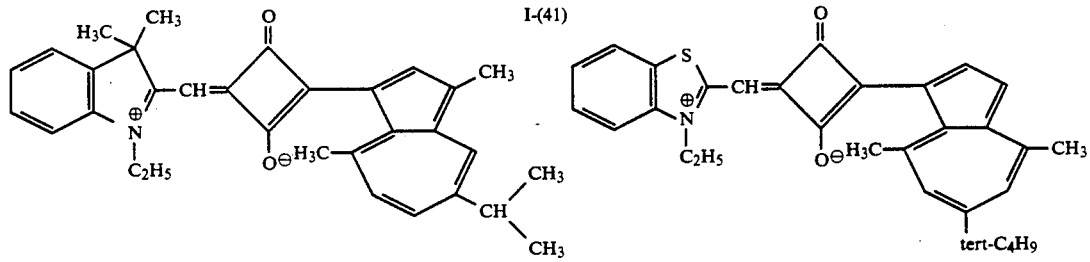
I-(41)  I-(42)
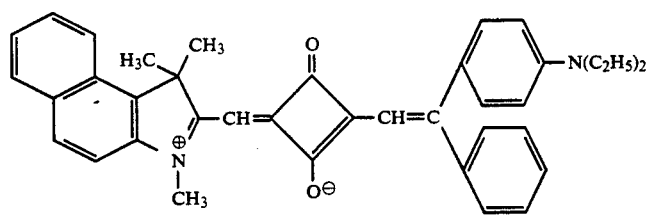
I-(43)
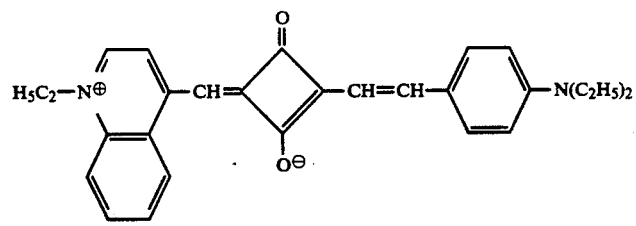
I-(44)
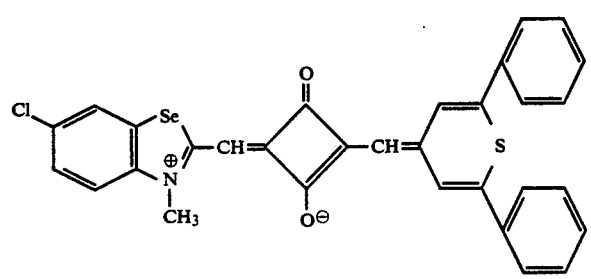
I-(45)

-continued
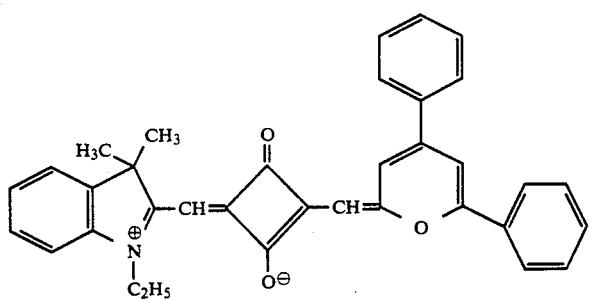
I-(46)
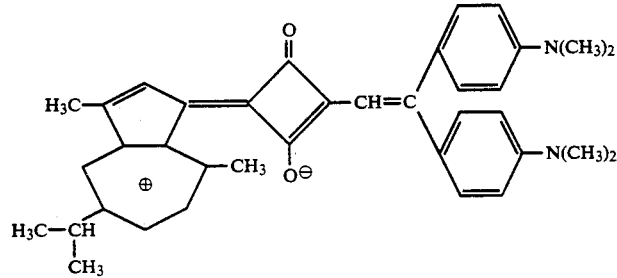
I-(47)
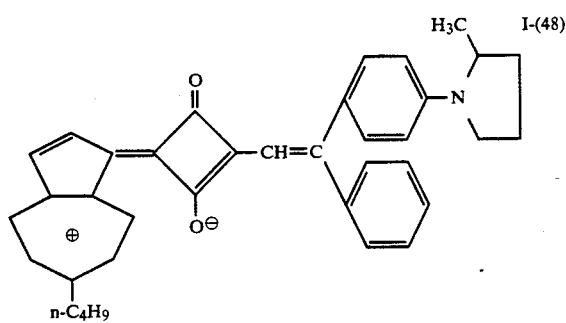
I-(48)
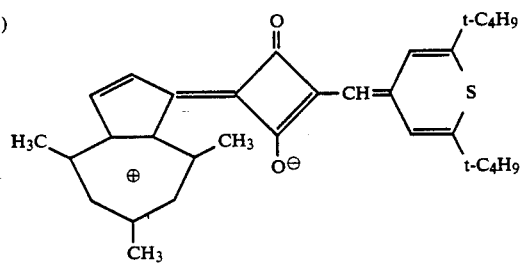
I-(49)
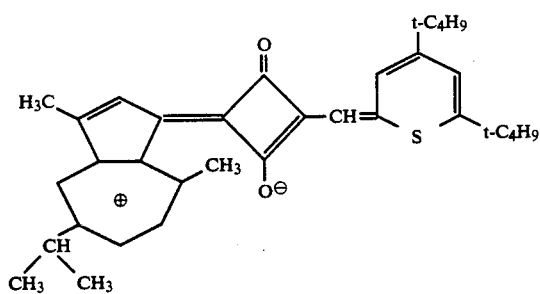
I-(50)
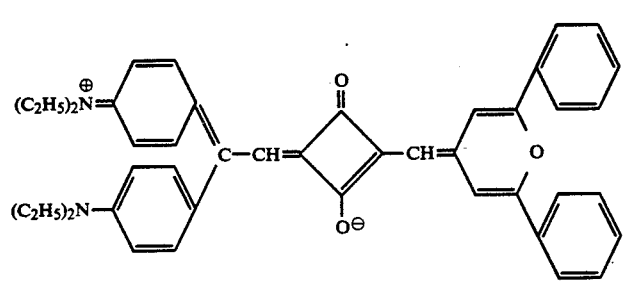
I-(51)

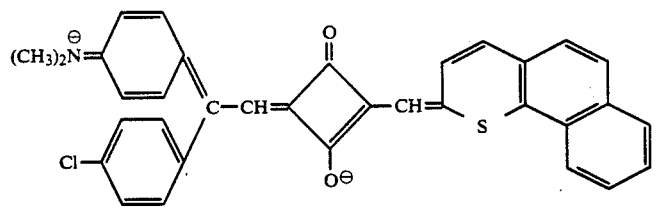
I-(52)
EXAMPLES OF THE GENERAL FORMULA (II)
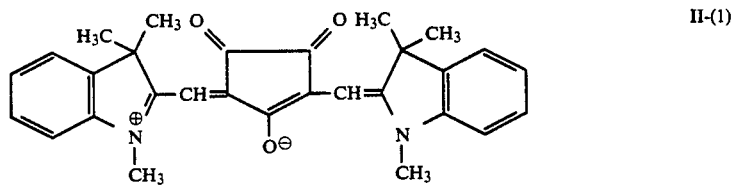
II-(1)
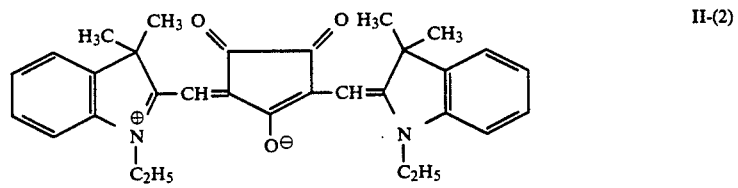
II-(2)
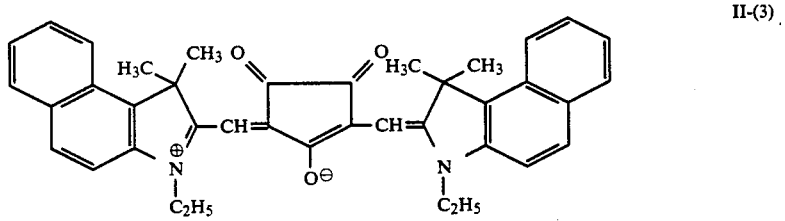
II-(3)
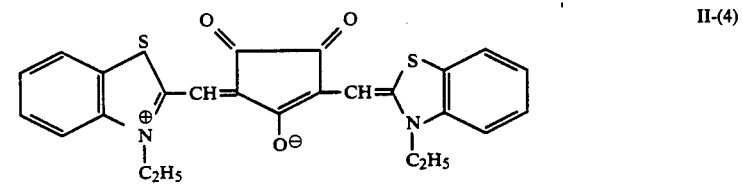
II-(4)
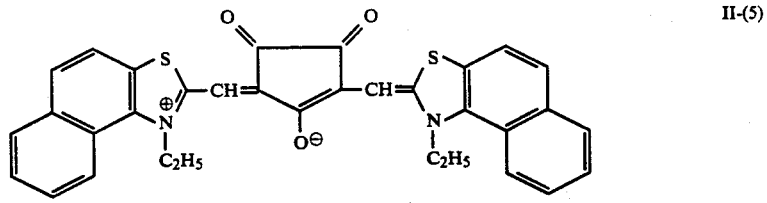
II-(5)
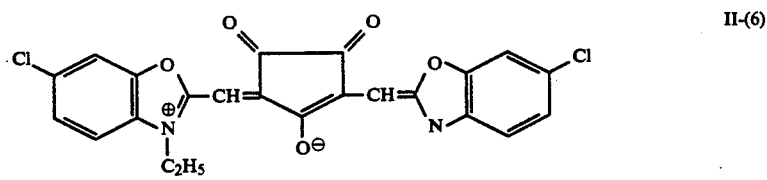
II-(6)
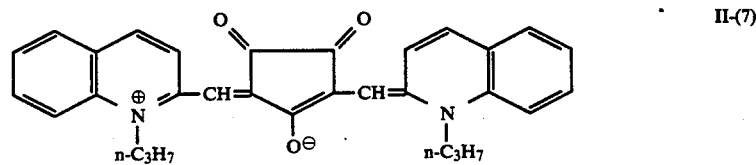
II-(7)

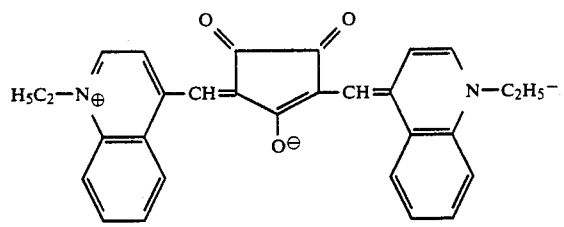
II-(8)
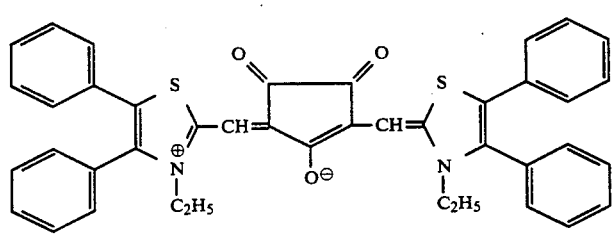
II-(9)
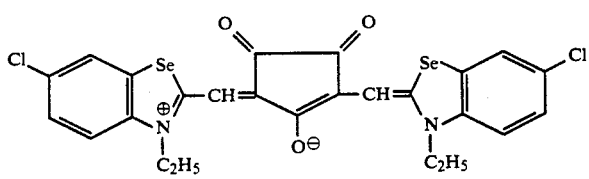
II-(10)
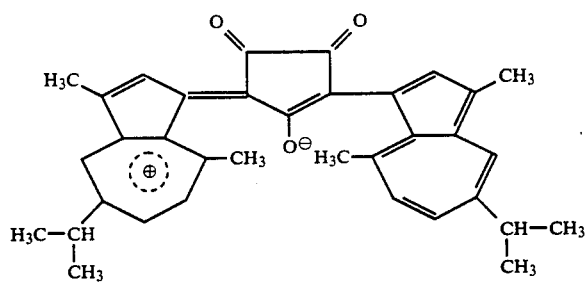
II-(11)
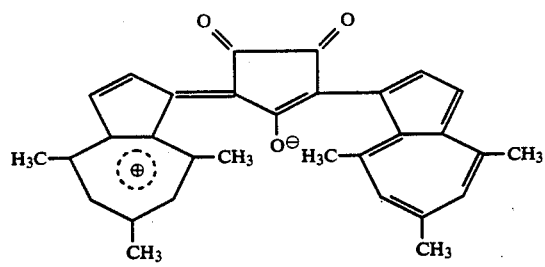
II-(12)
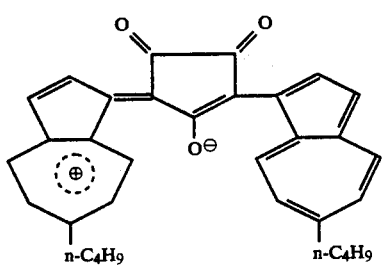
I-(13)

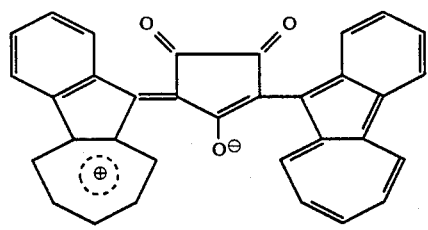
I-(14)
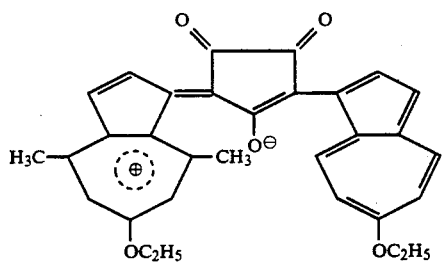
I-(15)
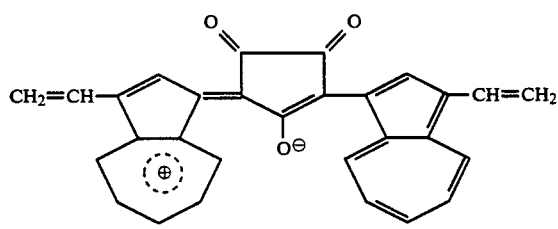
I-(16)
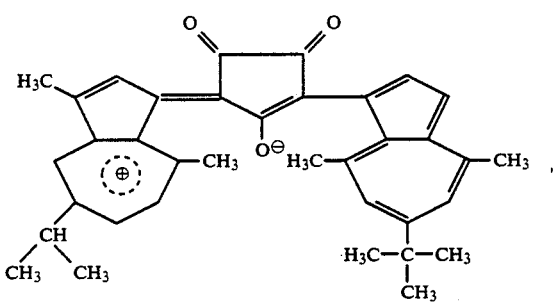
II-(17)
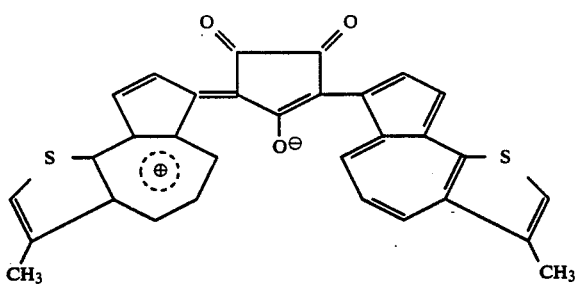
II-(18)
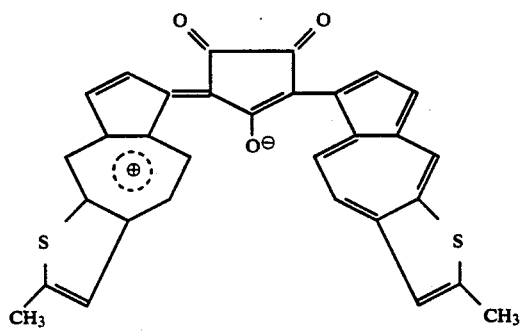
II-(19)

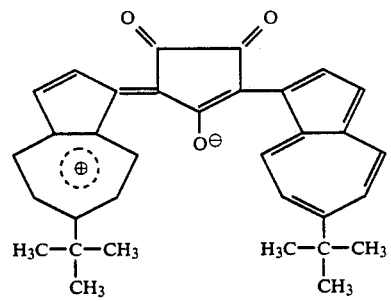
II-(20)
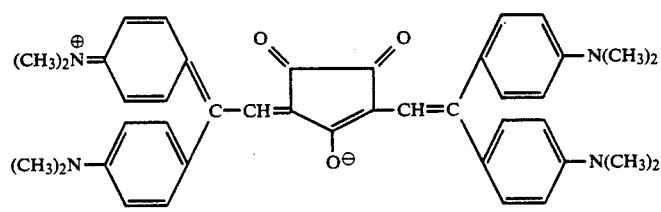
II-(21)
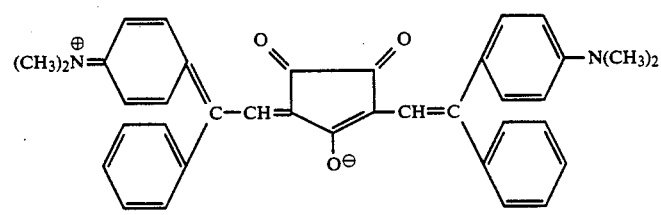
II-(22)
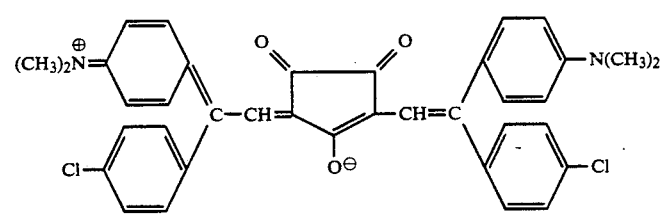
II-(23)
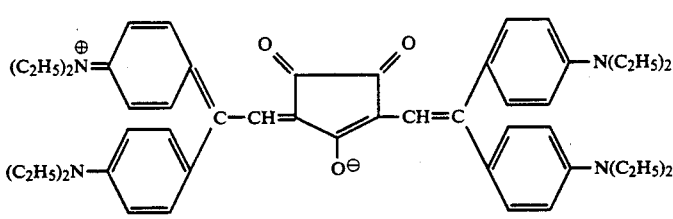
II-(24)
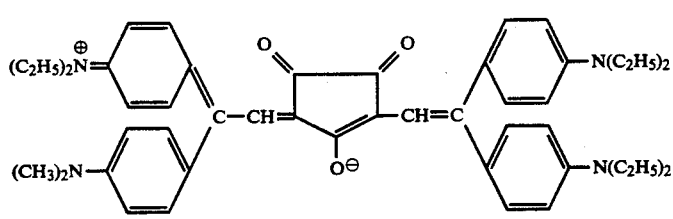
II-(25)
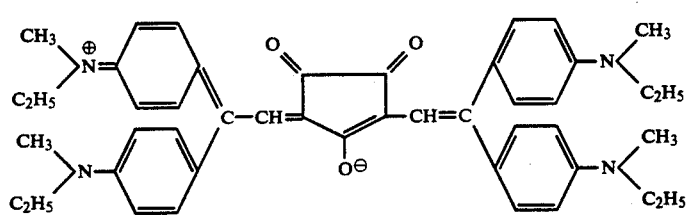
II-(26)

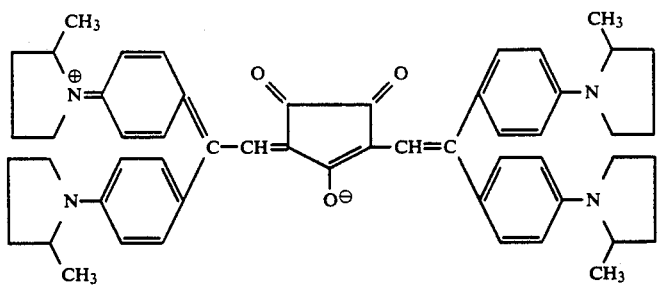
II-(27)
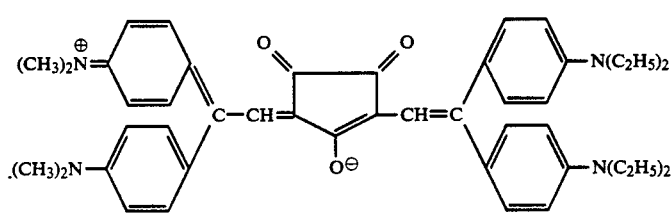
II-(28)
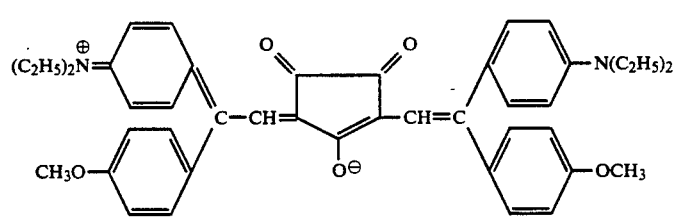
II-(29)
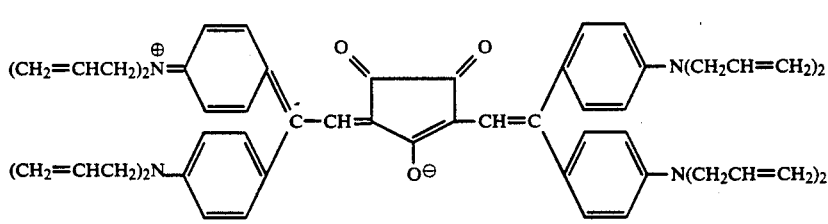
II-(30)
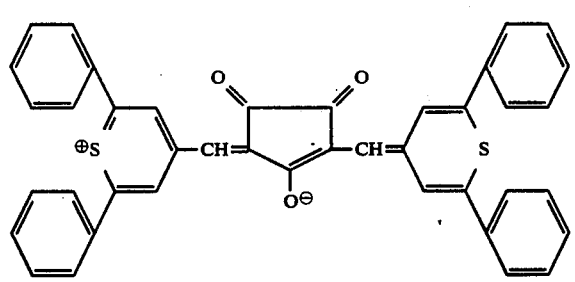
II-(31)
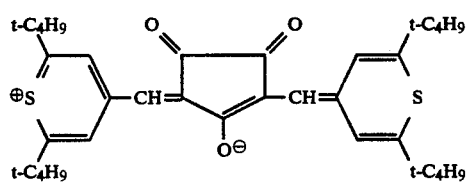
II-(32)

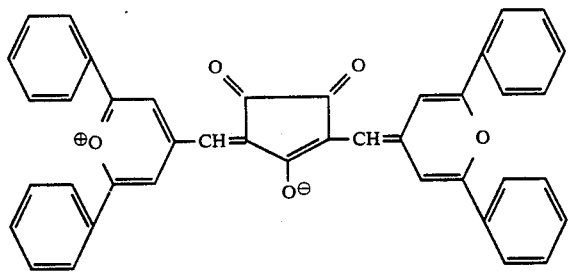
II-(33)
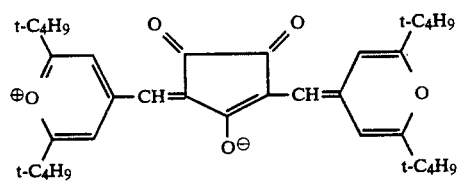
II-(34)
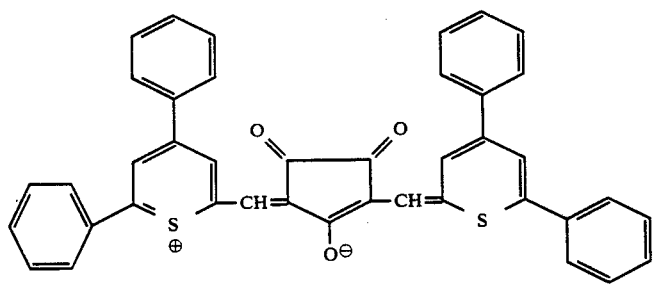
II-(35)
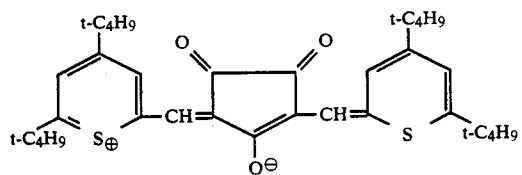
II-(36)
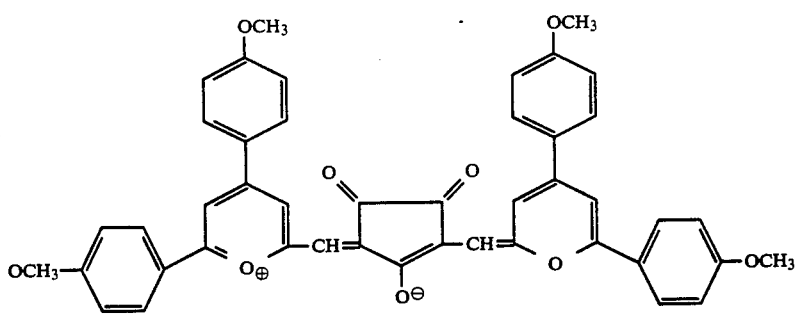
II-(37)
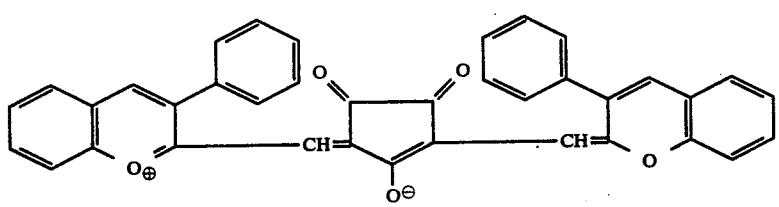
II-(38)
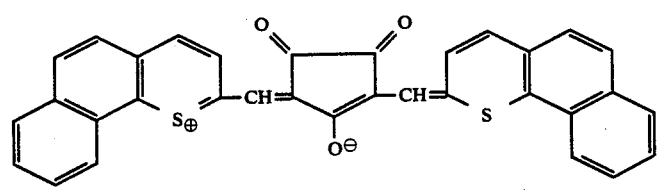
II-(39)

-continued
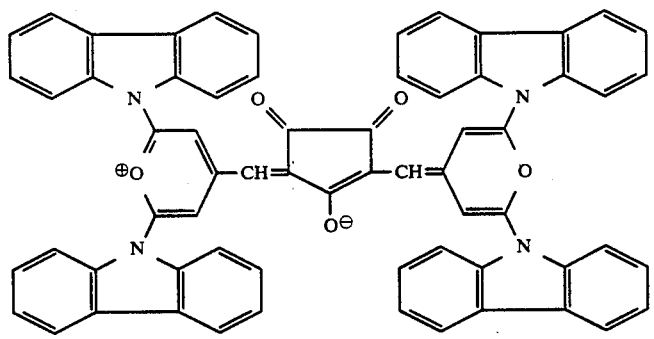
II-(40)
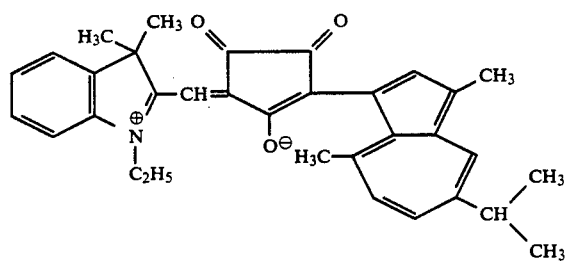
II-(41)
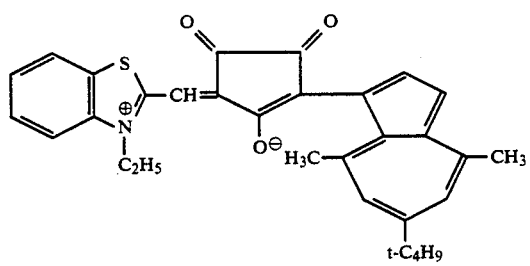
II-(42)
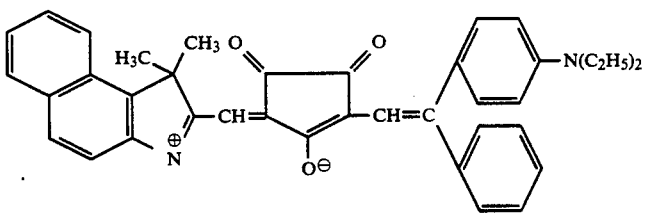
II-(43)
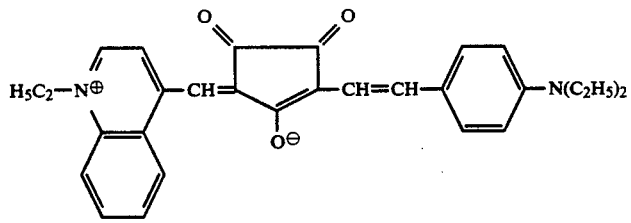
II-(44)
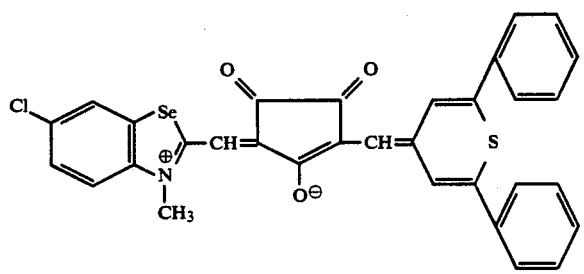
II-(45)

-continued
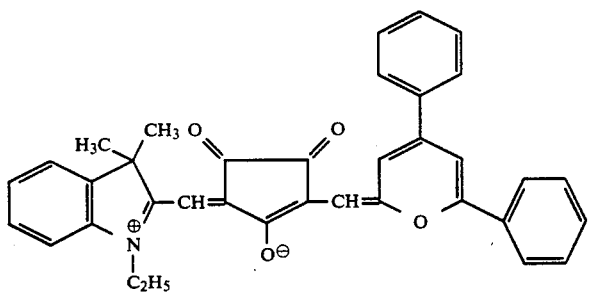
II-(46)
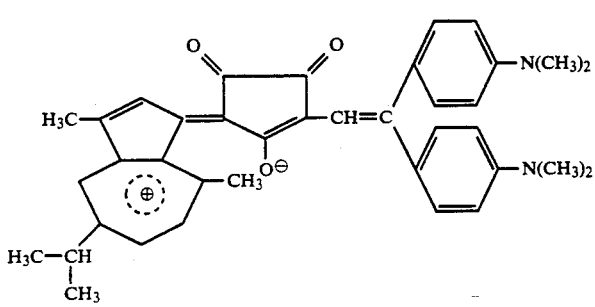
II-(47)
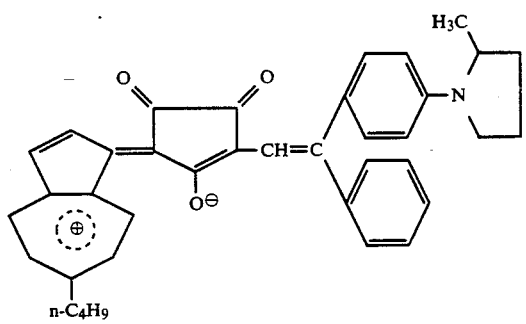
II-(48)
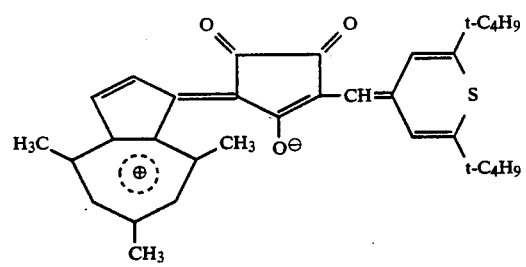
II-(49)
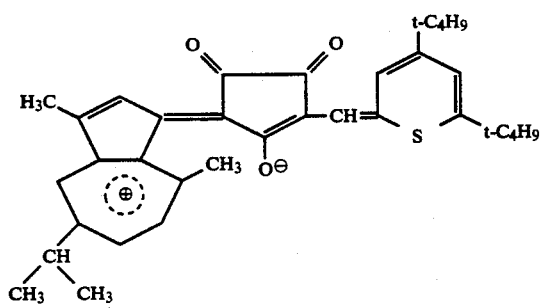
II-(50)

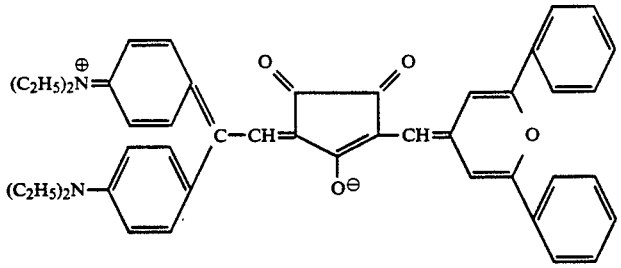

II-(51)

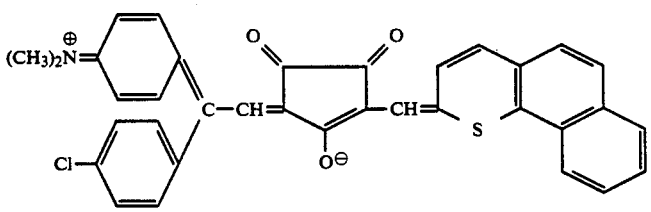

II-(52)

The carboxylic acid-base metallic complex of the present invention is a metallic salt of a carboxylic acid which can form a complex with both the dye compound described above and a metal. Particularly, the compound represented by the following general formula [XI] or [XII] is preferable for use as the carboxylic acid-base metallic complex:

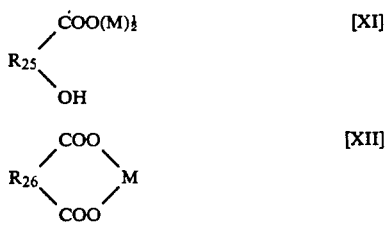

In the above general formulae [XI] and [XII], $R_{25}$ and $R_{26}$ each is a bivalent organic residue. Examples of the bivalent organic residue include a substituted or unsubstituted alkylene group, a substituted or unsubstituted bivalent aliphatic hydrocarbon residue having an unsaturated bond, a substituted or unsubstituted aromatic ring, a substituted or unsubstituted aliphatic ring, or a substituted or unsubstituted heterocyclic ring. Examples of the substituted or unsubstituted alkylene group include a methylene, ethylene, propylene, trimethylene, butylene, amylene or hexylene group. Examples of the bivalent aliphatic hydrocarbon residue having an unsaturated bond include a vinylene, propenylene, butenylene, or pentenylene residue. Examples of the aromatic ring include a benzene or naphtalene ring. Examples of the aliphatic ring include a cyclobutane, cyclopentane, cyclohexane, cycloheptane, cyclobutene, cyclopentene, cyclohexane, or cycloheptene ring. Examples of the heterocyclic ring include a furan, benzofuran, pyrrole, thiophene, pyridine, quinoline, or thiazole ring.

Among them, those carboxylic acid-base metallic complexes in which $R_{25}$ and $R_{26}$ each is any of substituted or unsubstituted alkylene groups having 2 to 4 carbon atoms substituted or unsubstituted bivalent aliphatic hydrocarbon residues with unsaturated bonds having 2 to 4 carbon atoms or substituted or unsubstituted benzene rings, naphthalene rings, aliphatic rings having 5, 6 and 7 members or heterocyclic rings, are preferable because they improve stability of the optical recording medium, which contains a squarylium- or croconium-base dye in its recording layer, against heat and light, and further because they are quite soluble in solvents which are employed in forming the recording layer. Those carboxylic acid-base metallic complexes in which $R_{25}$ is a substituted or unsubstituted naphthalene ring, i.e., where the carboxylic acid-base metallic complexes are metallic salts of a hydroxynapthoic acid, are particularly effective. Among them, a metallic salt of a 1-hydroxy-2-naphthoic acid or 2-hydroxy-3-naphtoic acid is most preferable.

In the general formulae [XI] and [XII], the metallic atom M is preferably a transition metal such as Zn, Ni, Co, Pd or Zr.

Of those metallic atoms, Zn is particularly suitable because of its superior effect in preventing fading of the squarylium- and croconium-dyes under heat or light.

Practical examples of the carboxylic acid-base metallic complex are enumerated below.

COMPOUND EXAMPLES OF GENERAL FORMULA (XI)

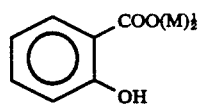

XI-(1)

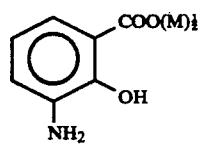

XI-(2)

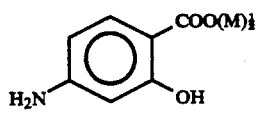

XI-(3)

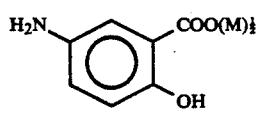

XI-(4)

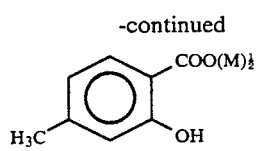 XI-(5)
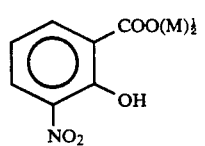 XI-(6)
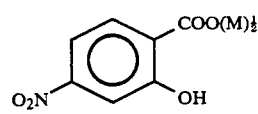 XI-(7)
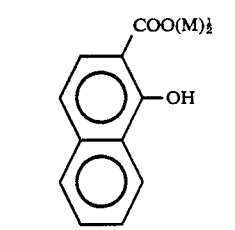 XI-(8)
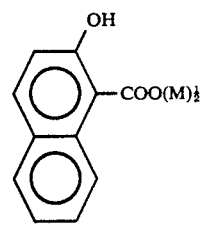 XI-(9)
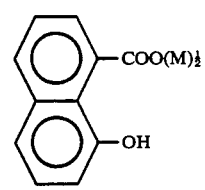 XI-(10)
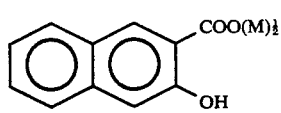 XI-(11)
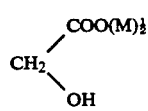 XI-(12)
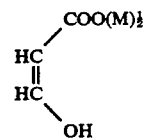 XI-(13)
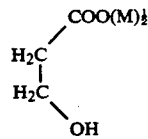 XI-(14)
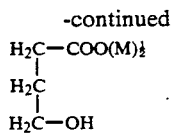 XI-(15)
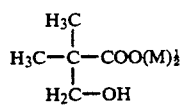 XI-(16)
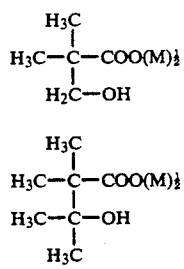 XI-(17)
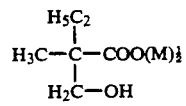 XI-(18)
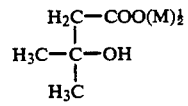 XI-(19)
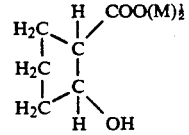 XI-(20)
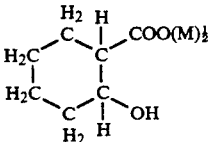 XI-(21)
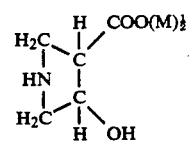 XI-(22)
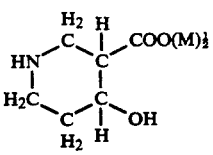 XI-(23)
COMPOUND EXAMPLES OF GENERAL FORMULA (XII)
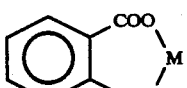 XII-(1)
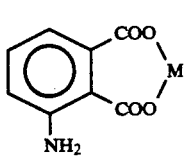 XII-(2)

-continued

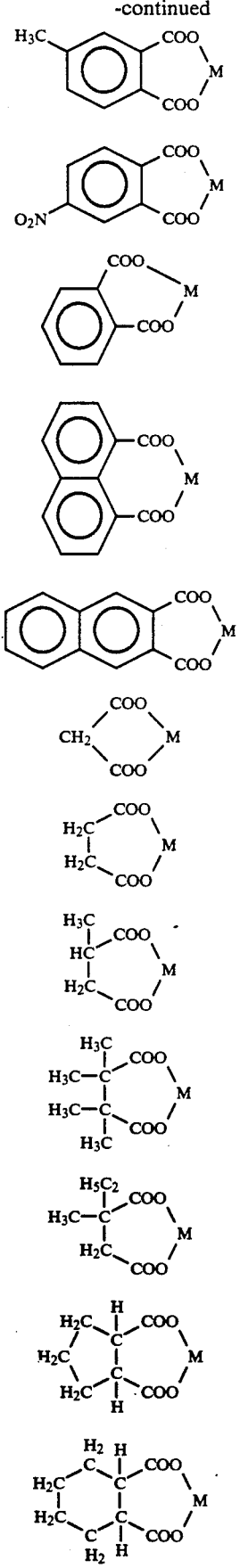

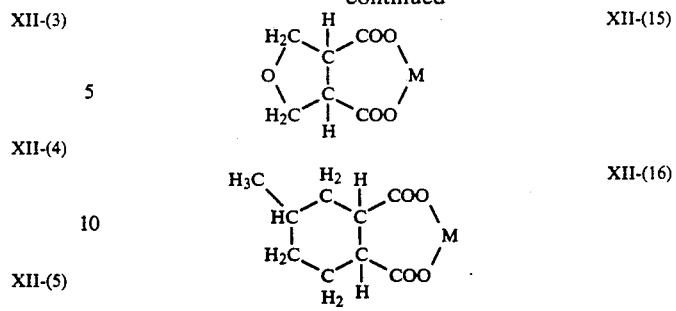

FIG. 1 shows, by way of example, that the optical recording medium of the present invention can be formed by providing a recording layer 2, which contains a dye compound represented by the foregoing formulae [I] or [II] and the aforesaid carboxylic acid-base metallic compound, on a substrate 1.

The substrate 1 can be a plate formed of plastics such as polycarbonate, polyester, acrylic resin, polyolefinic resin, phenol resin, epoxy resin, polyamide or polyimide, glass, or a metal.

In forming the recording layer 2, two or more of the dye compounds represented by the foregoing formulae [I] and [II] may be combined. Besides the above dye compounds, other dyes, such as naptholactam, polymethyne, azulene, pyrylium, triphenylmethane, xanthene, anthraquinone, cyanine, phthalocyanine, dioxazine, tetrahydrocholine, triphenothiazine, phenanthrene, aminium/diimonium salt, or metallic chelate complex dyes, or metals or metal compounds, such as Al, Te, Bi, Sn, In, Se, SnO, TeO$_2$, As or Cd, or a ultraviolet absorber may be mixed, dispersed or laminated.

Preferably, the recording layer 2 is formed on the substrate 1 by a coating method. In this case, the recording layer 2 can be formed by preparing a solution in which the squarylium- or croconium-base dye is dissolved or dispersed, and then coating the solution on the substrate 1. A binder may be mixed in the recording layer, if necessary, in consideration of the film forming property and the stability of the coating.

The type of solvents which can be used in coating the recording layer 2 depends on whether the dye compound and the carboxylic acid-base metallic complex are dispersed or dissolved therein. Generally, alcohol, ketone, amide, ether, ester, aliphatic halogenated hydrocarbon, aromatic hydrocarbon, or aliphatic hydrocarbon solvents are usable.

Examples of the binder include nitrocellulose, ethylcellulose, polystyrene, polyvinylpyrrolidone, polymethylmethacrylate, or polyamide. Wax, higher fatty acids, or amides (e.g., oleil amide) are used as an additive, if necessary.

The above binder can be added with a plasticizer such as dioctylphthalate, dibutylphthalate, or tricresilphosphate, oil such as mineral or vegetable oil, a dispersant such as alkylbenzenesulfonic soda or polyoxyethylenealkylphenyl ether, or other additive, as appropriate, for improving film-forming property and coating stability of the recording layer.

The recording layer can be applied using a coating method such as a dip coating, spray coating, spinner coating, bead coating, Meyer-bar coating, blade coating, curtain coating, roller coating, or gravure coating method.

The content of the squarylium- or croconium-base dye or a mixture thereof in the recording layer 2 is normally in a range of 40-95 weight %, preferably 50-90 weight % of the total weight of the recording layer, in order that the recording layer 2 has enough light absorbency to perform recording and sufficient reflectance for the regenerating light.

It is desired that the content of the carboxylic acid-base metallic complex based on the total weight of the recording material used to form the recording layer is on the order of 1-60 weight %, preferably 5-50 weight %.

The film thickness of the recording layer 2 is in the range of 100 Å-20 μm, preferably 200 Å-1 μm. Note that the film thickness should be as thin as possible while still allowing the thin film to have sufficient reflectance for the recording laser beam.

Figure 2:
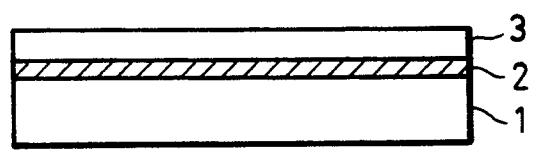

FIG. 2 shows that in the optical recording medium of the present invention, a protective layer 3 transparent to the recording and regenerating laser beam may be provided on the recording layer 2. When the laser beam is irradiated from the side of the substrate 1, the protective layer 3 may be opaque.

Figure 3:
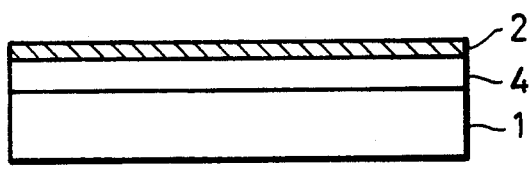

FIG. 3 shows that, furthermore, an undercoat layer 4 may be provided between the substrate 1 and the recording layer 2.

Figure 4:
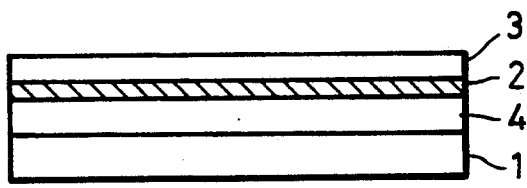

FIG. 4 shows that it is further possible to provide both the protective layer 3 and the undercoat layer 4 on and below the recording layer 2 respectively.

The undercoat layer 4 is provided for the purposes of (a) increasing adhesive ability, (b) providing a barrier against water or gas, (c) improving preservation stability of the recording layer, (d) increasing reflectance, (e) protecting the substrate from solvents, and (f) forming pre-grooves and the like for guiding the laser beam. In order to achieve purpose (a), various high molecular materials, such as ionomer resin, polyamide resin, vinyl resin, natural high molecular material, silicone and liquid rubber, or other various substances such as silane coupling agents can be employed. To achieve purposes (b) and (c), inorganic compounds, such as $SiO_2$, $MgF_2$, SiO, $TiO_2$, ZnO, TiN and SiN, or metals or semimetals, such as Zn, Cu, S, Ni, Cr, Ge, Se, Cd, Ag and Al can be employed in addition to the above high molecular materials. To achieve purpose (d), metals, such as Al and Ag, or organic thin films having metal brilliance, such as cyanine or methyne dyes can be employed. To achieve purposes (e) and (f), ultraviolet setting resin, thermosetting resin, thermoplastic resin or the like can be employed. A suitable film thickness of the undercoat layer is in a range of 50 Å-100 μm, preferably 200 Å-30 μm.

The protective layer is provided for the purposes of protecting the recording layer from scratches, dusts or other contamination, improving preservation stability of the recording layer, and improving reflectance. The protective layer can be formed using the same material as that of the undercoat layer. A suitable film thickness of the protective layer is greater than 100 Å, preferably greater than 1000 Å.

In this connection, the undercoat layer and/or the protective layer may contain the dyes represented by the general formulae [I] and [II] and/or the carboxylic acid-base metallic complex according to the present invention. Also, the undercoat layer or the protective layer may contain a stabilizer, dispersant, flame retarder, charging preventive agent, surfactant, plasticizer and the like.

Figure 5:
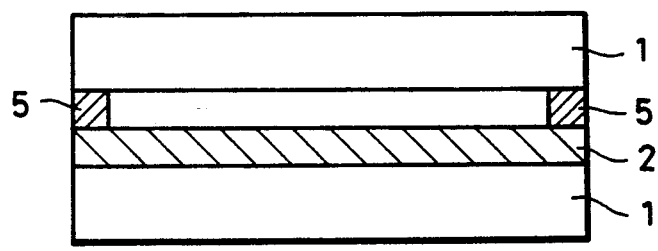
Figure 6:
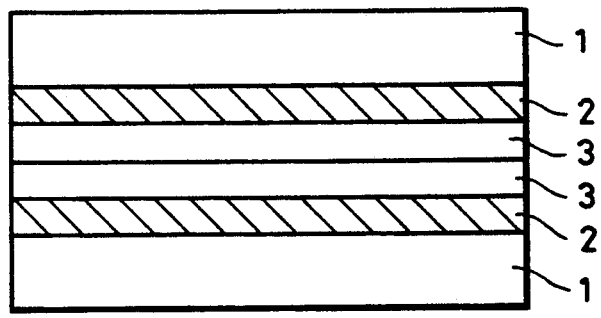

As another construction of the optical recording medium according to the present invention, two recording media having the same construction shown in any of FIGS. 1 to 4 (one of which may be only the substrate alone depending on circumstances) may be held together in a sealing contact using spacer 5 into a so-called air sandwiched structure with the recording layer 2 placed in the inner side (shown in FIG. 5), or the recording layers 2 may be bonded through their protective layers 3 into a so-called joined (laminated) structure (shown in FIG. 6).

According to the optical recording medium of the present invention, information can be recorded on the medium even upon irradiation of a beam emitted from a gas laser such as a helium-neon laser (oscillation wavelength 633 nm). However, it is preferably to record information on the medium upon irradiation of a laser beam having the wavelength in a near-infrared or infrared region, i.e., a beam emitted from a laser having an oscillation wavelength longer than 750 nm, particularly, a gallium-aluminum-arsenic semiconductor laser (oscillation wavelength 830 nm). The information can be read using any of the laser beams mentioned above. Writing and reading may be carried out using lasers having the same wavelength or lasers having different wavelengths.

As described above, because the recording layer according to the present invention contains the squarylium- and/or croconium-base dye of ampholyte ion type and the carboxylic acid-base metallic complex, it is possible to:

(1) obtain an optical recording medium with high sensitivity even by the use of a long wavelength laser (semiconductor laser) and a high C/N ratio due to the formation of good-shaped pits; and (2) obtain an optical recording medium having high stability against heat and light, superior long term preservation and little deterioration upon regeneration.

EXAMPLES

Hereinafter, the present invention will be described in more detail by referring to Examples.

EXAMPLE 1

A 30 μm thick layer of epoxy-acrylate ultraviolet setting resin was formed on a substrate of polymethylmethacrylate (hereinafter abbreviated to as "PMMA") with a diameter of 130 mmφ and a thickness of 1.2 mm, following which a spiral tracking groove of 0.6 μm width and 1.6 μm pitch was formed on the ultraviolet setting resin layer by a 2P method (photopolymer method). Next, the aforesaid squarylium-base dye No. I-2 and the aforesaid carboxylic acid-base metallic complex No. XI-8 were dissolved in 1,2-dichloroethane with a weight ratio of the dye to the metallic complex of 80:20, and the resultant solution was coated on the grooved resin layer by a spinner coating method and then dried to obtain an organic thin film layer of 850 Å.

The optical recording medium thus produced was mounted on a turntable. While the turntable was rotated by a motor at 1800 rpm, information was written to the organic thin film recording layer from the substrate side using a semiconductor laser with an oscillation wavelength of 830 nm and spot size of 1.5 μmφ, recording power of 8 mW and recording frequency of 3 MHz, and then regenerated with reading power of 0.8 mW. The regenerated waveform was subjected to spectrum analysis (using a scanning filter with a band width of 30 KHz) to measure the C/N (carrier/noise) ratio.

Next, the information recorded on the recording medium under the above measuring conditions was repeatedly read $10^6$ times from the same recording medium, followed by measuring the C/N ratio.

Then, the same recording medium fabricated under the above conditions was left to sit at 65° C., 85% RH for 2000 hours, followed by measuring the reflectance (measured at 830 nm) and the C/N ratio, as a test for the preservation stability of the recording medium against the environment. Also, a xenon lamp beam of 1000 W/m$^2$ (300-900 nm) was irradiated to the same recording medium for 100 hours, followed by measuring the reflectance (measured at 830 nm) and the C/N ratio, as a test for the stability of the recording medium against light. The results are shown in Table-1. Note that the reflectance value was calculated on the basis of an output signal value obtained by a pickup of the optical card recording and regenerating apparatus.

TABLE - 1

| Ex. | Initial Refl. (%) | Initial C/N (dB) | After $10^6$ Repeated Regen. C/N (dB) | Preservation Stability 65° C., 85% RH After 2000 hr Refl. (%) | Preservation Stability 65° C., 85% RH After 2000 hr C/N (dB) | Stability against Light Xe Lamp 1 KW/m$^2$ After 100 hr Refl. (%) | Stability against Light Xe Lamp 1 KW/m$^2$ After 100 hr C/N (dB) |
|---|---|---|---|---|---|---|---|
| 1 | 25.0 | 57 | 55 | 23.8 | 55 | 22.6 | 53 |

EXAMPLES 2-8

Recording media were fabricated in the same manner as Example 1 except that the squarylium-base dye and the carboxylic acid-base metallic complex employed in Example 1 were replaced by new combinations of a squarylium- or croconium-base dye and a carboxylic acid-base metallic complex, shown in following Table-2, thereby to provide optical recording media of Examples 2-8.

The optical recording media of Examples 2-8 were measured in the same manner as Example 1. The measured results are shown in Table-4.

TABLE - 2

| Ex. | Squarylium or Croconium dye (D) | Carboxylic Acid-Base Metallic Complex (C) (M = Zn) | Weight Ratio (D:C) |
|---|---|---|---|
| 2 | I-(11) | XI-(11) | 80:20 |
| 3 | I-(24) | XII-(5) | 70:30 |
| 4 | I-(32) | XII-(7) | 80:20 |
| 5 | I-(41) | XI-(1) | 85:15 |
| 6 | II-(4) | XI-(1) | 80:20 |
| 7 | II-(11) | XII-(1) | 85:15 |
| 8 | II-(22) | XII-(9) | 90:10 |

COMPARATIVE EXAMPLES 1 AND 2

Optical recording media were fabricated in the same manner as Example 1 and 7 except that the carboxylic acid-base metallic complexes No. XI-(8) and XII-(1) employed in Examples 1 and 7 were omitted from the thin film layer. The optical recording media produced were then measured in the same manner. The results are shown in Table-4.

COMPARATIVE EXAMPLE 3

An optical recording medium was fabricated in the same manner as Example 1 except that a bis-dithionickel complex represented by the following structure (Bis(4-diethylamino dithio benzil)Nickel manufactured by Eastman Kodak Co. Ltd.) is used in place of the carboxylic acid-base metallic complex employed in Example 1. The optical recording medium produced was then measured in the same manner as Example 1. The results are shown in Table-4.

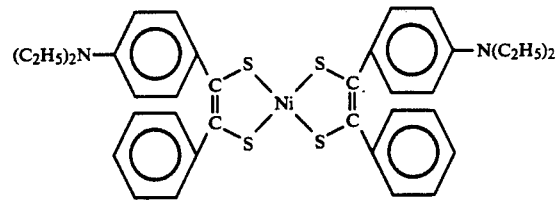

EXAMPLES 9-12

4 weight parts of a mixture given by the combinations of a squarylium or croconium dye (D) and a carboxylic acid-base metallic complex (C) shown in following Table-3, and 1 weight part of nitrocellulose resin (Auhareslacker manufactured by Daisel Chemical Ltd.) were mixed with 95 weight part of diacetone alcohol. The resultant solution was coated by a spinner coating method on a polycarbonate substrate formed with pregrooves, having diameter of 130 mmφ and thickness of 1.2 mm, to obtain a recording layer with film thickness of 950 Å after drying.

The optical recording media thus produced were measured in the same manner as Example 1. The results are shown in Table-4.

TABLE - 3

| Ex. | Squarylium or Croconium dye (D) | Carboxylic Acid-Base Metallic Complex (C) (M = Zn) | Weight Ratio (D:C) |
|---|---|---|---|
| 9  | I-(4)   | XI-(21)  | 70:30 |
| 10 | I-(21)  | XII-(3)  | 75:25 |
| 11 | II-(34) | XI-(5)   | 85:15 |
| 12 | II-(43) | XII-(5)  | 80:20 |

TABLE - 4

| | Initial Refl. (%) | Initial C/N (dB) | After $10^6$ Repeated Regen. C/N (dB) | Preservation Stability 65° C., 85% RH After 2000 hr Refl. (%) | Preservation Stability 65° C., 85% RH After 2000 hr C/N (dB) | Stability against Light Xe Lamp 1 KW/m$^2$ After 100 hr Refl. (%) | Stability against Light Xe Lamp 1 KW/m$^2$ After 100 hr C/N (dB) |
|---|---|---|---|---|---|---|---|
| Ex. | | | | | | | |
| 2 | 24.5 | 55 | 52 | 23.1 | 54 | 22.6 | 52 |
| 3 | 20.1 | 53 | 50 | 19.3 | 50 | 18.8 | 48 |
| 4 | 20.4 | 51 | 48 | 19.2 | 49 | 18.5 | 47 |
| 5 | 23.7 | 52 | 50 | 22.5 | 51 | 20.2 | 49 |
| 6 | 24.6 | 54 | 52 | 22.0 | 52 | 21.7 | 51 |
| 7 | 25.3 | 56 | 54 | 24.0 | 53 | 22.5 | 53 |
| 8 | 26.4 | 52 | 49 | 24.5 | 50 | 23.4 | 49 |
| Comparative Examples | | | | | | | |
| 1 | 22.5 | 51 | 37 | 16.8 | 45 | 14.2 | 32 |
| 2 | 21.0 | 50 | 33 | 17.9 | 46 | 12.5 | 30 |
| 3 | 21.5 | 52 | 46 | 17.0 | 45 | 17.6 | 45 |
| Examples | | | | | | | |
| 9  | 21.3 | 52 | 48 | 19.3 | 49 | 18.0 | 47 |
| 10 | 24.2 | 55 | 52 | 23.0 | 42 | 21.3 | 50 |
| 11 | 25.5 | 56 | 53 | 24.2 | 54 | 22.5 | 51 |
| 12 | 24.6 | 55 | 51 | 22.7 | 53 | 21.0 | 49 |

EXAMPLES 13-16

A tracking groove of 3 μm width and 12 μm pitch was formed by a heat pressing method on a wallet-sized polycarbonate (hereinafter abbreviated to as "PC") substrate with thickness of 0.4 mm. A squarylium- and/or croconium-base dye and a carboxylic acid-base metallic complex in the combinations shown in following Table-5 were mixed with diacetone alcohol. The resultant solution was coated on the grooved substrate by a bar coating method and then dried to obtain an organic thin film recording layer of 850 Å. A wallet-sized PC substrate with thickness of 0.3 mm was bonded onto the recording layer via a dry film of ethylene-vinyl acetate copolymer by a heat rolling method, thereby obtaining an optical recording medium of a joined structure.

The optical recording media of Examples 13-16 thus produced were each mounted on a stage movable in the X-Y directions. Information was written to the organic thin film recording layer in the Y-axis direction from the side of the 0.4 mm thick PC substrate using a semiconductor laser of the oscillation wavelength 830 nm with spot size of 3.0 μmφ, recording power of 4.0 mW and recording pulse of 80 μsec, and then regenerated with reading power of 0.4 mW. The contrast ratio [(A-B)/A: A is the signal intensity for an unrecorded region, and B is the signal intensity for a recorded region)] was measured. Note that the reflectance value was calculated on the basis of an output signal value obtained by a pickup of the optical card recording and the regenerating apparatus.

Then, the same recording media fabricated under the above conditions were subjected to a test of preservation stability against the environment and a test of stability against light under the same conditions as Example 1 by measuring the reflectance and contrast ratio for each test. The results are shown in Table-6.

TABLE - 5

| Ex. | Squarylium or Croconium dye (D) | Carboxylic Acid-Base Metallic Complex (C) (M = Zn) | Weight Ratio (D:C) |
|---|---|---|---|
| 13 | I-(3) | XI-(1) | 80:20 |
| 14 | I-(29) | XII-(5) | 75:25 |
| 15 | II-(1) | XI-(8) | 80:20 |
| 16 | II-(12) | XII-(7) | 85:15 |

COMPARATIVE EXAMPLE 4

An optical card was fabricated in the same manner as Example 13 except that a bis-dithionickel complex employed in Comparative Example 3 is used in place of the carboxylic acid-base metallic complex in Example 13. The optical card produced was measured in the same manner as Example 13. The results are shown in Table-6.

COMPARATIVE EXAMPLE 5

An optical card was fabricated in the same manner as Example 13 except that the carboxylic acid-base metallic complex No. XI-(8) employed in Example 13 is omitted. The optical card produced was measured in the same manner as Example 13. The results are shown in Table-6.

TABLE - 6

| | Initial | | Preservation Stability 65° C., 85% RH After 2000 hr | | Stability against Light Xe Lamp 1 KW/m² After 100 hr | |
|---|---|---|---|---|---|---|
| | Refl. (%) | Contrast Ratio (dB) | Refl. (%) | Contrast Ratio (dB) | Refl. (%) | Contrast Ratio (dB) |
| EX. | | | | | | |
| 13 | 15.2 | 0.81 | 14.7 | 0.79 | 12.9 | 0.73 |
| 14 | 14.7 | 0.80 | 14.0 | 0.77 | 12.3 | 0.71 |
| 15 | 15.1 | 0.81 | 14.4 | 0.78 | 11.8 | 0.69 |
| 16 | 15.6 | 0.83 | 15.0 | 0.80 | 13.7 | 0.74 |
| Comparative Examples | | | | | | |
| 4 | 14.9 | 0.78 | 13.5 | 0.65 | 11.3 | 0.58 |
| 5 | 14.6 | 0.75 | 11.2 | 0.54 | 9.7 | 0.49 |

From the foregoing Examples and Comparative Examples, it will be appreciated that the recording media containing the combination of a squarylium and/or croconium dye and a carboxylic acid-base metallic complex according to the present invention show improved sensitivity and a high C/N ratio and improved preservation stability against both heat and light.

What is claimed is:

1. An optical recording medium comprising
   (a) a squarylium- or croconium-base dye of formulae (I) or (II):

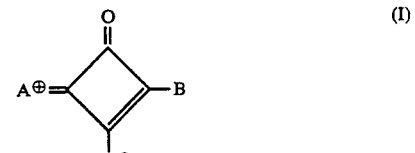

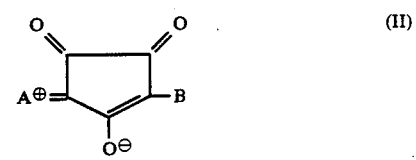

wherein $A^{\oplus}$ is a cationic bivalent organic residue and B is a monovalent organic residue; and (b) a carboxylic acid-base metallic complex of the formulae (XI) or (XII):

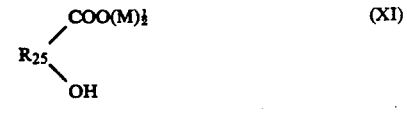

wherein M is a metal atom, and each of $R_{25}$ and $R_{26}$ is a substituted or unsubstituted alkylene group, a substituted or unsubstituted aromatic ring, a substituted or unsubstituted aliphatic ring, a substituted or unsubstituted heterocyclic ring, or a substituted or unsubstituted aliphatic hydrocarbon residue with an unsaturated bond.

2. An optical recording medium according to claim 1, wherein said bivalent organic residue A is a bivalent organic residue of formulae (III)-(VI):

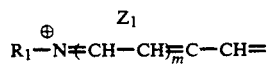 (III)

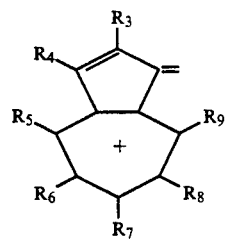 (IV)

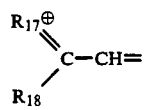 (V)

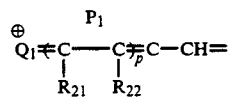 (VI)

where
- $R_1$ is a hydrogen atom, a substituted or unsubstituted alkyl group, a cyclic alkyl group, an allyl group, a substituted or unsubstituted aralkyl group, or a substituted or unsubstituted aryl group;
- $R_3$, $R_4$, $R_5$, $R_6$, $R_7$, $R_8$ and $R_9$ are independently a hydrogen atom, a halogen atom, or a monovalent organic residue, and at least one of the combinations ($R_3$ and $R_4$), ($R_4$ and $R_5$), ($R_5$ and $R_6$), ($R_6$ and $R_7$), ($R_7$ and $R_8$), and ($R_8$ and $R_9$) may form a substituted or unsubstituted condensed ring;
- $R_{17}$ and $R_{18}$ are independently a hydrogen atom, a substituted or unsubstituted alkyl group, a substituted or unsubstituted aryl group, a substituted or unsubstituted styryl group, or a substituted or unsubstituted heterocyclic group;
- $Q_1$ is a sulfur atom, an oxygen atom, or a selenium atom, and $P_1$ is any hydrocarbon group necessary to complete a substituted or unsubstituted pyrane, thiopyrane, selenapyrane, benzopyrane, benzothiopyrane, benzoselenapyrane, naphthopyrane, naphthothiopyrane, or naphthoselenapyrane ring; and
- $R_{21}$ and $R_{22}$ are independently a hydrogen atom, a substituted or unsubstituted alkyl group, a substituted or unsubstituted alkoxy group, a substituted or unsubstituted aryl group, a substituted or unsubstituted styryl group or 4-phenyl-1,3-butadienyl group, or a substituted or unsubstituted heterocyclic group.

3. An optical recording medium according to claim 1, wherein one of B is one of formulae (VII)–(X):

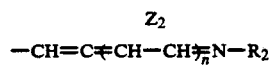 (VII)

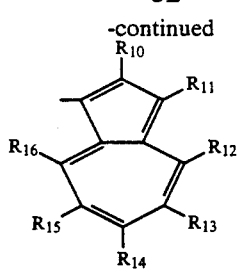 (VIII)

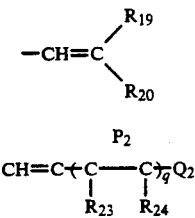 (IX)

$$-CH=C{+}C{-\!\!\!-}C{\overline{\uparrow}_q}Q_2 \quad (X)$$
with $R_{23}$, $R_{24}$ where
- $R_2$ is a hydrogen atom, a substituted or unsubstituted alkyl group, a cyclic alkyl group, an allyl group, a substituted or unsubstituted aralkyl group, or a substituted or unsubstituted aryl group;
- $Z_2$ is an atomic group necessary to complete a substituted or unsubstituted heterocyclic ring, and m is an integer of 0 or 1;
- $R_{10}$, $R_{11}$, $R_{12}$, $R_{13}$, $R_{14}$, $R_{15}$ and $R_{16}$ are independently a hydrogen atom, a halogen atom, or a monovalent organic residue, and at least one of the combinations ($R_{10}$ and $R_{11}$), ($R_{11}$ and $R_{12}$), ($R_{12}$ and $R_{13}$), ($R_{13}$ and $R_{14}$), ($R_{14}$ and $R_{15}$), and ($R_{15}$ and $R_{16}$) may form a substituted or unsubstituted condensed ring;
- $R_{19}$ and $R_{20}$ are independently a hydrogen atom, a substituted or unsubstituted alkyl group, a substituted or unsubstituted aryl group, a substituted or unsubstituted styryl group, or a substituted or unsubstituted heterocyclic group;
- $Q_2$ is a sulfur atom, an oxygen atom, or a selenium atom, and $P_2$ is any hydrocarbon group necessary to complete a substituted or unsubstituted pyrane, thiopyrane, selenapyrane, benzopyrane, benzothiopyrane, benzoselenapyrane, naphthopyrane, naphthothiopyrane, or naphthoselenapyrane ring; and
- $R_{23}$ and $R_{24}$ are independently a hydrogen atom, a substituted or unsubstituted alkyl group, a substituted or unsubstituted alkoxy group, a substituted or unsubstituted aryl group, a substituted or unsubstituted styryl group or 4-phenyl-1,3-butadienyl group, or a substituted or unsubstituted heterocyclic group.

4. An optical recording medium according to claim 1, wherein $R_{25}$ and $R_{26}$ are independently a substituted or unsubstituted alkylene group having 2 to 4 carbon atoms, a substituted or unsubstituted bivalent aliphatic hydrocarbon residue with an unsaturated bond having 2 to 4 carbon atoms, or a substituted or unsubstituted benzene ring, naphthalene ring, aliphatic ring having five, six or seven members, or a heterocyclic ring.

5. An optical recording medium according to claim 1, wherein said carboxylic acid-base metallic complex is a compound of formula (XI), and $R_{25}$ is a metallic salt of a hydroxynaphthoic acid as a naphthalene ring.

6. An optical recording medium according to claim 1, wherein said carboxylic acid-base metallic complex is a metallic salt of a 1-hydroxy-2-naphthoic acid or a metallic salt of a 2-hydroxy-3-naphthoic acid.

7. An optical recording medium according to claim 1, wherein said carboxylic acid-base metallic complex, said metal atom M is a transition metal.

8. An optical recording medium according to claim 5, wherein said metal atom is Zn.

* * * * *

UNITED STATES PATENT AND TRADEMARK OFFICE
CERTIFICATE OF CORRECTION

PATENT NO. 5,190,849
DATED     March 2, 1993
INVENTOR(S) SANTOH ET AL.

It is certified that error appears in the above-indentified patent and that said Letters Patent is hereby corrected as shown below:

COLUMN 1

Line 29, "tenhnique" should read --technique--.

Line 32, "an other" should read --another--.

Line 50 "consisted" should read --consisting--.

Line 56, "characteriatrics" should read --characteristics--.

COLUMN 2

Line 67, "dyes" should read --dye--.

COLUMN 5

Line 7,

"   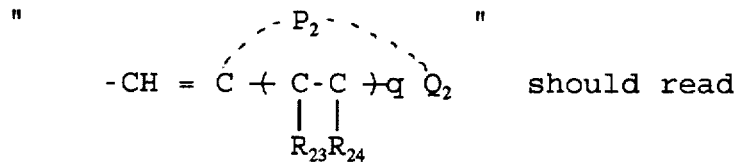   "   should read

--   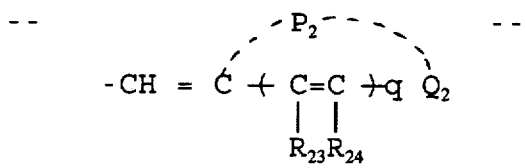   --

UNITED STATES PATENT AND TRADEMARK OFFICE
CERTIFICATE OF CORRECTION

PATENT NO. : 5,190,849
DATED : March 2, 1993
INVENTOR(S) : SANTOH ET AL.

It is certified that error appears in the above-indentified patent and that said Letters Patent is hereby corrected as shown below:

COLUMN 5

Line 68, "napto" should read --naphtho--.

COLUMN 6

Line 14, "selenazoline such as" should --selenazoline series nucleus such as--.

Line 28, "1-ethyl-5-dichloroben-" should read --1-ethyl-5,5-dichloroben--.

Line 29, "1-ethyl-5-dichlorobenzoimidazole" should read --1-ethyl-5,6-dichlorobenzoimidazole--.

Line 31, "benzo imidazole" should read --benzoimidazole--.

Line 35, "-5-carboxy-ben-" should read -- -5-carboxyben- --.

Line 42, "-5-trifluoromethylsulfonyl-ben-" should read -- -5-trifluoromethylsulfonylben- --.

Line 43, "-5-trifluoromethylsulfinyl-ben-" should read -- -5-trifluoromethylsulfinylben- --.

Line 61, "particcularly," should read --particularly,--

UNITED STATES PATENT AND TRADEMARK OFFICE
CERTIFICATE OF CORRECTION

PATENT NO. 5,190,849
DATED    March 2, 1993
INVENTOR(S) SANTOH ET AL.

It is certified that error appears in the above-indentified patent and that said Letters Patent is hereby corrected as shown below:

COLUMN 7

Line 54, "dibenzylamino-phenyl," should read --dibenzylaminophenyl,--.

Line 60, "ethoxy-styryl" should read --ethoxystyryl--.

Line 64, "2-(diehylaminophenyl)-" should read --2-(diethylaminophenyl)- --.

Line 65, "(diehylamino-" should read --(diethylamino- --.

Line 66, "(methoxy-phenyl)" should read --(methoxyphenyl)--.

Line 67, "(dimehylaminophenyl)" should read --(dimethylaminophenyl)--.

COLUMN 8

Line 1, "diehyl-aminophenyl)" should read --(diethylaminophenyl)--.

Line 53, "dimethoxy-styryl," should read --dimethoxystyryl,--.

Line 55, "(p-diethyl-amino-" should read --(p-diethylamino- --.

UNITED STATES PATENT AND TRADEMARK OFFICE
CERTIFICATE OF CORRECTION

PATENT NO. : 5,190,849　　　　　　　　　　　Page 4 of 9
DATED : March 2, 1993
INVENTOR(S) : SANTOH ET AL.

It is certified that error appears in the above-indentified patent and that said Letters Patent is hereby corrected as shown below:

COLUMN 11

Formula I-(11), "⊕" should read -- $\oplus$ --.
Formula I-(12), "⊕" should read -- $\oplus$ --.
Formula I-(14), "⊕" should read -- $\oplus$ --.
Formula I-(16), "⊕" should read -- $\oplus$ --.

COLUMN 12

Formula I-(13), "⊕" should read -- $\oplus$ --.
Formula I-(15), "⊕" should read -- $\oplus$ --.
Formula I-(17), "⊕" should read -- $\oplus$ --.
Formula I-(18), "⊕" should read -- $\oplus$ --.

COLUMN 13

Formula I-(19), "⊕" should read -- $\oplus$ --.

COLUMN 14

Formula I-(20), "⊕" should read -- $\oplus$ --.

COLUMN 21

Formula I-(47), "⊕" should read -- $\oplus$ --.
Formula I-(48), "⊕" should read -- $\oplus$ --.

UNITED STATES PATENT AND TRADEMARK OFFICE
CERTIFICATE OF CORRECTION

PATENT NO. : 5,190,849  
DATED : March 2, 1993  
INVENTOR(S) : SANTOH ET AL.

Page 5 of 9

It is certified that error appears in the above-indentified patent and that said Letters Patent is hereby corrected as shown below:

COLUMN 22

Formula I-(49), "⊕" should read -- (+) --.
Formula I-(50), "⊕" should read -- (+) --.

COLUMN 23

Formula I-(52), "N⊖" should read -- N⊕ -- .

COLUMN 39

Line 54, "naphtalene" should read --naphthalene--.
Line 57, "cyclohexane" should read --cyclohexene--
Line 63, "atoms" should read --atoms,--.

COLUMN 40

Line 32, "hydroxynapthoic" should read --hydroxynaphthoic--.
Line 34, "3-naphtoic" should read --3-naphthoic--.
Line 41, "croconium-dyes" should read --croconium-based dyes--.

UNITED STATES PATENT AND TRADEMARK OFFICE
CERTIFICATE OF CORRECTION

PATENT NO. : 5,190,849
DATED : March 2, 1993
INVENTOR(S) : SANTOH ET AL.

It is certified that error appears in the above-indentified patent and that said Letters Patent is hereby corrected as shown below:

COLUMN 43

Line 12, " 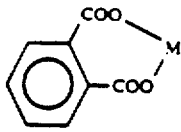 XII-(5) " should read

-- XII - (5) 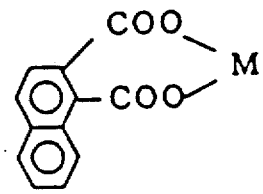 --

COLUMN 44

Line 28, "naptholactam," should read --naphtholactam,--.

COLUMN 46

Line 16, "preferably" should read --preferable--.

COLUMN 48

Line 1, "diethylamino dithio benzil) should read --diethylaminodithiobenzil)--.
Line 21, "squarylium or croconium" should read --squarylium- or croconium-based--.
Line 37, "Squarylium or Croconium dye" should read --Squarylium- or Croconium-based dye--.

UNITED STATES PATENT AND TRADEMARK OFFICE
CERTIFICATE OF CORRECTION

PATENT NO. : 5,190,849

DATED : March 2, 1993

INVENTOR(S) : SANTOH ET AL.

It is certified that error appears in the above-indentified patent and that said Letters Patent is hereby corrected as shown below:

COLUMN 49

Line 5, "to" should be deleted.
Line 8, "in" should read --in the--.
Line 24, "wavelength" should read --wavelength of--.
Line 29, "region)]" should read --region]--.
Line 42, "Squarylium or Croconium dye" should read --Squarylium- or Croconium-based dye--.
Line 55, "is" should read --was--.
Line 64, "is" should read --was--.

COLUMN 50

Line 19, "squarylium" should read --squarylium- --.
Line 20, "croconium" should read --croconium-based--.

COLUMN 51

Line 3, "
$$R_1-N \!\!\!\not=\!\! CH-CH \!\!\not\models_m\! \overset{\overset{\oplus}{Z_1}}{C}-CH=$$
" should read $$-- R_1-\overset{\overset{\oplus}{\overbrace{\phantom{xxxxx}Z_1\phantom{xxxxx}}}}{N \!\!\!\not=\!\! CH-CH \!\!\not\models_m\! C}-CH= --.$$

Line 10, " + " should read --$\left(\!\!+\!\!\right)$--.

UNITED STATES PATENT AND TRADEMARK OFFICE
CERTIFICATE OF CORRECTION

PATENT NO. : 5,190,849

DATED : March 2, 1993

INVENTOR(S) : SANTOH ET AL.

It is certified that error appears in the above-indentified patent and that said Letters Patent is hereby corrected as shown below:

COLUMN 51

Line 22,

" $Q_1 \!+\! (C\text{-----}C)_P \overset{P_1}{C\text{-}CH=}$ " should read

-- $Q_1 \!+\! (C\text{-----}C)_P \overset{\overset{P_1}{\frown}}{C\text{-}CH=}$ -- .

(with $R_{21}$ under first C and $R_{22}$ under second C in both formulas)

Line 65,

" $-CH=C \!+\! (CH\text{-}CH)_n \overset{Z_2}{N\text{-}R_2}$ " should read

-- $-CH=C \!+\! (CH\text{-}CH)_n \overset{\overset{Z_2}{\frown}}{N\text{-}R_2}$ -- .

UNITED STATES PATENT AND TRADEMARK OFFICE
CERTIFICATE OF CORRECTION

PATENT NO. 5,190,849
DATED     March 2, 1993
INVENTOR(S) SANTOH ET AL.

It is certified that error appears in the above-indentified patent and that said Letters Patent is hereby corrected as shown below:

COLUMN 52

Line 16,

" 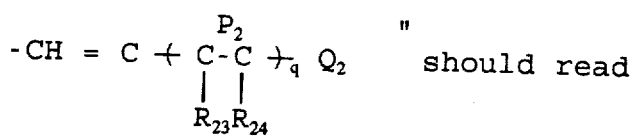 " should read

-- 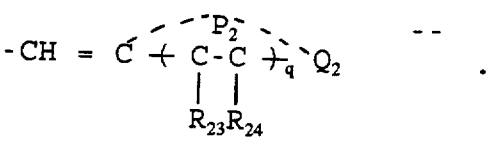 --.

Signed and Sealed this

Fifteenth Day of March, 1994

BRUCE LEHMAN

Attest:

*Attesting Officer*     *Commissioner of Patents and Trademarks*